US012614160B2

(12) United States Patent
Hecht et al.

(10) Patent No.: US 12,614,160 B2
(45) Date of Patent: Apr. 28, 2026

(54) DISTRIBUTION UTILITY

(71) Applicant: Wells Fargo Bank, N.A., San Francisco, CA (US)

(72) Inventors: Alan W. Hecht, San Francisco, CA (US); Karen L. Moore, Vacaville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/367,402

(22) Filed: Sep. 12, 2023

(65) Prior Publication Data

US 2023/0419278 A1 Dec. 28, 2023

Related U.S. Application Data

(63) Continuation of application No. 17/679,950, filed on Feb. 24, 2022, now Pat. No. 11,803,824.

(51) Int. Cl.
| | |
|---|---|
| *G06Q 20/10* | (2012.01) |
| *G06Q 20/02* | (2012.01) |
| *G06Q 20/04* | (2012.01) |

(52) U.S. Cl.
CPC ........... *G06Q 20/10* (2013.01); *G06Q 20/027* (2013.01); *G06Q 20/04* (2013.01)

(58) Field of Classification Search
CPC ....... G06Q 20/10; G06Q 20/027; G06Q 20/04
USPC ..................................................... 705/1.1, 35
See application file for complete search history.

(56) References Cited

U.S. PATENT DOCUMENTS

| | | | |
|---|---|---|---|
| 7,319,983 B2 | 1/2008 | Colabella et al. | |
| 7,493,282 B2 | 2/2009 | Manly et al. | |
| 7,792,717 B1 | 9/2010 | Hankins et al. | |
| 9,367,873 B2 | 6/2016 | Wottowa et al. | |
| 9,749,394 B1 * | 8/2017 | Syal ......................... | H04L 51/23 |
| 10,660,039 B1 * | 5/2020 | Petersen ............... | H04W 68/02 |
| 10,977,635 B2 * | 4/2021 | Storiale ................ | G06Q 20/202 |
| 11,588,913 B1 * | 2/2023 | Castro ..................... | H04L 67/55 |
| 2011/0218971 A1 * | 9/2011 | Cooper ................... | G06F 16/00 |
| | | | 707/689 |

(Continued)

FOREIGN PATENT DOCUMENTS

| | | | | | |
|---|---|---|---|---|---|
| CA | 2734914 A1 | * | 9/2011 | ............. | G06Q 20/10 |
| CN | 113869897 A | * | 12/2021 | | |
| CN | 117321619 A | * | 12/2023 | ............. | G06N 20/00 |

*Primary Examiner* — William E Rankins

(74) *Attorney, Agent, or Firm* — Foley & Lardner LLP

(57) ABSTRACT

A method includes: receiving an indication of a distribution initiating event; identifying resources associated with the distribution initiating event; retrieving a hierarchical ordering matrix that utilizes at least one parameter to control a distribution of the resources; determining a preferred rail for distributing the resources based on the at least one parameter associated with at least one of the resources or a customer relative to the hierarchical ordering matrix, whereby determining the preferred rail includes receiving a customer preference regarding a preferred distribution methodology for the resources, and selecting one of the plurality of rails to be the preferred rail based on the received customer preference and an amount of the resources to be distributed being less than a max transfer amount of the one of the plurality of rails that is selected to be the preferred rail; and initiating the distribution of the resources via the preferred rail.

15 Claims, 6 Drawing Sheets

(56) References Cited

U.S. PATENT DOCUMENTS

| | | | |
|---|---|---|---|
| 2013/0013500 A1 | 1/2013 | Purves et al. | |
| 2014/0172693 A1* | 6/2014 | Kanjlia | G07F 19/206 |
| | | | 705/39 |
| 2015/0019567 A1* | 1/2015 | Li | G06F 16/335 |
| | | | 707/748 |
| 2019/0239825 A1* | 8/2019 | Kumar | A61B 5/7435 |
| 2019/0279175 A1 | 9/2019 | Devan et al. | |
| 2019/0333141 A1 | 10/2019 | Bowers et al. | |
| 2019/0392475 A1* | 12/2019 | Woodbury, Jr. | G06Q 20/42 |
| 2020/0184444 A1* | 6/2020 | Gu | G07G 1/0036 |
| 2021/0004898 A1 | 1/2021 | Kanjlia et al. | |

* cited by examiner

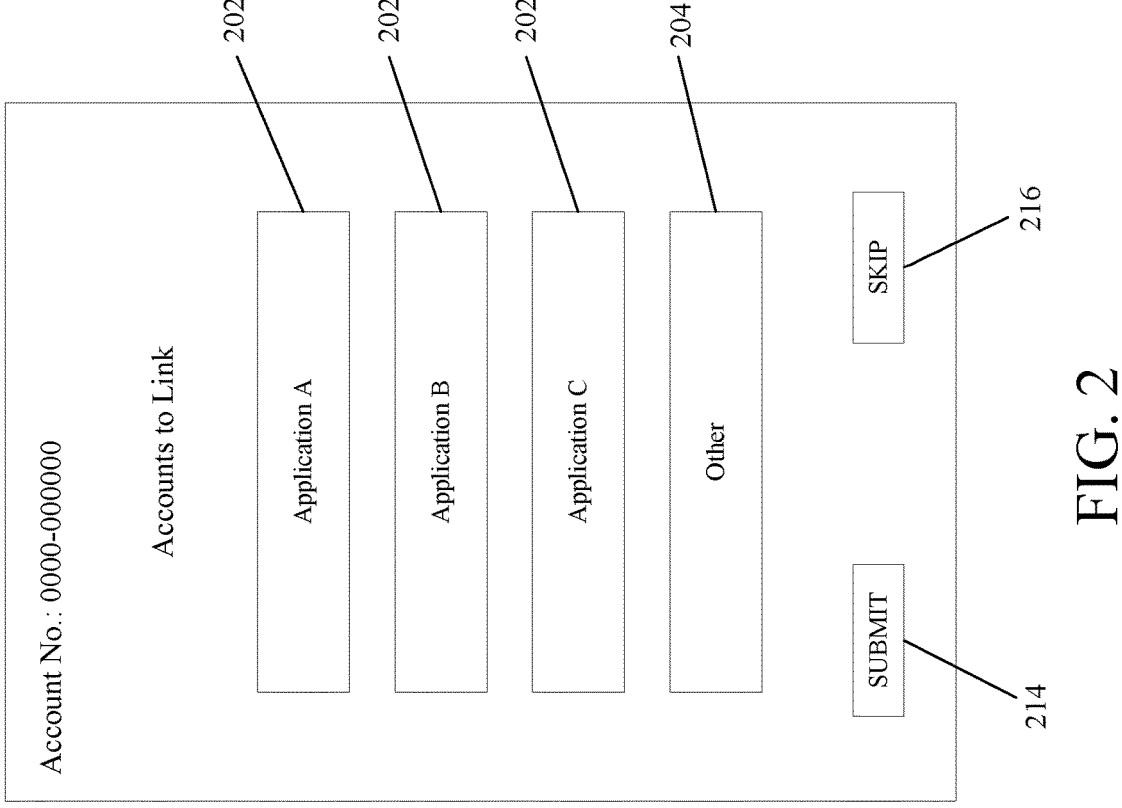
FIG. 2

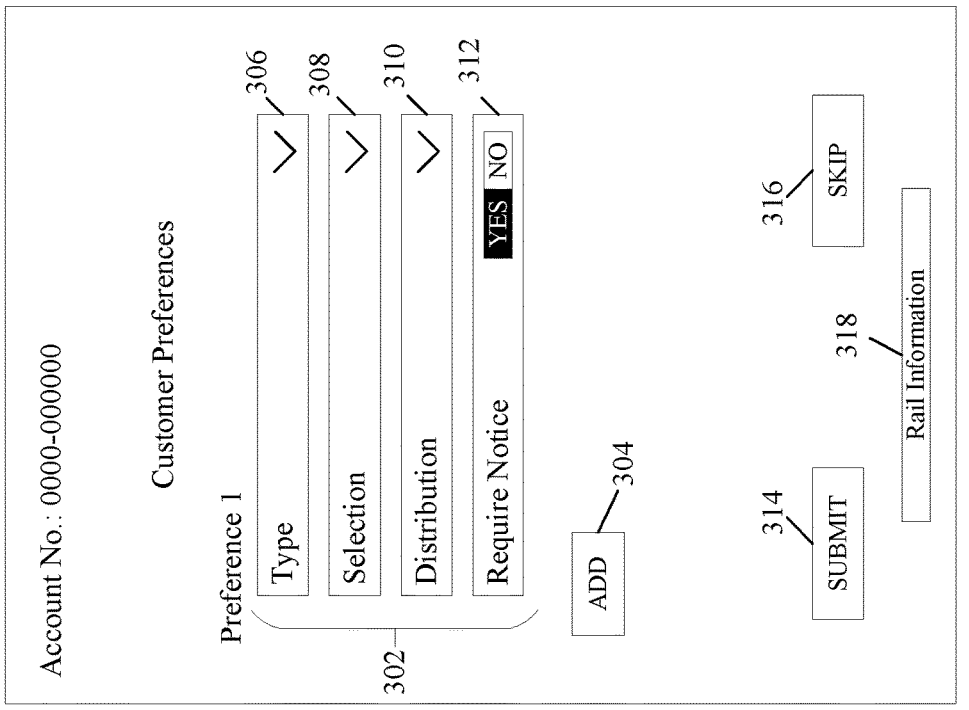
FIG. 3

| Rank | Rail | Routing | Speed | Max Transfer Amount | Cost | Notes |
|------|------|---------|-------|---------------------|------|-------|
| 1 | Transfer | Provider Institution Deposit Account | Real time | Large | $0 | Requires valid PI deposit account (may be brokerage also) |
| 2 | Zelle® | Token Based | Real time for registered customers | $50,000 | $0 | Registered banks |
| 3 | Real Time Payment (RTP) | RT/Account | Real time for participating banks (limited) | $100,000 | $0 | Low relative ubiquity |
| 4 | FedNow | RT/Account | Real time | | $0 | Not live until 2023/2024 |
| 5 | Original Credit Transfer (OCT) | Card Number | Real Time | $20,000 | $0 | Most debit/prepaid cards |
| 6 | Automated Clearing House (ACH) | RT/Account | 0-3 business days | $50,000 | $0 | Registered banks |
| 7 | Wire Transfer | RT/Account | Same day (or next business day depending on business hours) | Large | Varies | Large $$ or international |
| 8 | Cashier's Check | Payee | Physical delivery or mail | Large | $0 | No known account |
| 9 | Positive Pay Check | Payee | Mail | Large | $0 | Similar to cashier's check |
| 10 | Prepaid Card | Payee | Physical delivery or mail | | $0 | Best/safest option for unbanked |
| 11 | Cash | Physical | Real Time; physical delivery | Large | $0 | Lowest common denominator; high risk |

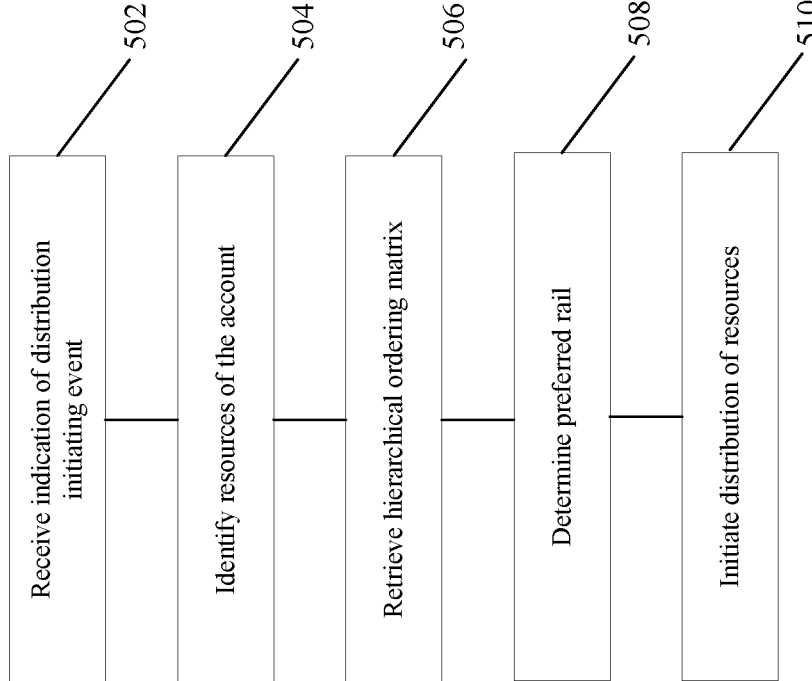
Receive indication of distribution initiating event — 502
Identify resources of the account — 504
Retrieve hierarchical ordering matrix — 506
Determine preferred rail — 508
Initiate distribution of resources — 510
500
FIG. 5

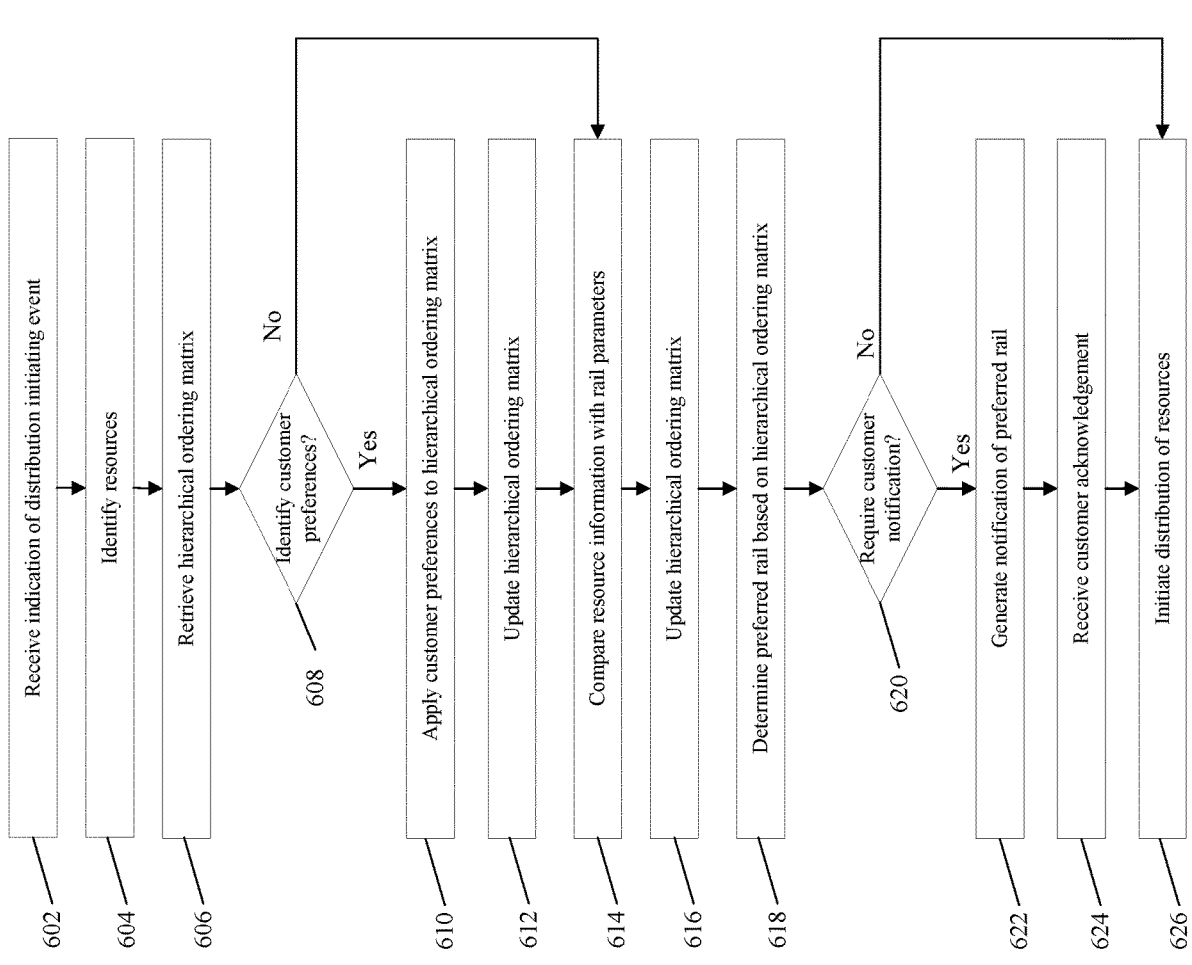

602  Receive indication of distribution initiating event

604  Identify resources

606  Retrieve hierarchical ordering matrix

608  Identify customer preferences?

No

Yes

610  Apply customer preferences to hierarchical ordering matrix

612  Update hierarchical ordering matrix

614  Compare resource information with rail parameters

616  Update hierarchical ordering matrix

618  Determine preferred rail based on hierarchical ordering matrix

620  Require customer notification?

No

Yes

622  Generate notification of preferred rail

624  Receive customer acknowledgement

626  Initiate distribution of resources

DISTRIBUTION UTILITY

CROSS-REFERENCE TO RELATED APPLICATION

The present application is a continuation of U.S. application Ser. No. 17/679,950, titled "DISTRIBUTION UTILITY," filed Feb. 24, 2022, which is incorporated herein by reference in its entirety and for all purposes.

TECHNICAL FIELD

The present disclosure relates to a distribution utility. More specifically, the present disclosure relates to improved systems and methods for processing and completing distributions that increase the efficiency and reliability of such distribution systems.

BACKGROUND

Account closures entail technically burdensome processes associated with the distribution of resources contained in the to-be-closed account. In this regard, distributing resources from an account can include various obstacles that inhibit or delay a provider institution from completing a distribution. As an example, a provider institution can distribute resources from an account to an owner of the account by sending a check in the mail. Distributing resources in such a manner can be inefficient, unreliable, and costly (e.g., envelope and postage costs). Moreover, significant computing resources are utilized to track the distribution, such as the physical check, to determine if and when the check was cashed in order to completely close the account. This entails the provider institution expending computing resources to keep the account open in order to receive data associated with the check. However and to complicate matters, the check may go uncashed because the customer does not know to look for it. In sum, these checks can be a liability to the provider institution. The importance of efficient and reliable resource distribution has increased given the number of entities/actors that may encounter a need for resources of an account to be distributed.

SUMMARY

A first example embodiment relates to computer-implemented method of distributing resources. The method includes receiving, by a computing system associated with a provider institution, an indication of a closing of an account associated with a customer of the provider institution. The method includes, subsequent to receiving the indication, identifying, by the computing system, resources of the account. The method includes retrieving, by the computing system, a hierarchical ordering matrix that utilizes at least one parameter to control distribution of the resources. The method includes determining, by the computing system, a preferred rail for distributing the resources based on an application of at least one parameter associated with at least one of the resources or the customer. The method includes initiating, by the computing system, a distribution of the resources via the preferred rail.

A second example embodiment relates to a system for automatic resource distribution. The system includes an accounts database configured to retrievably store data corresponding to plurality of accounts. The data includes personal information, customer preferences, authentication information, and financial information. The system includes a processing circuit configured to receive an indication of a closing of an account associated with a customer of a provider institution. The processing circuit is configured to, subsequent to receipt of the indication, identify resources of the account. The processing circuit is configured to retrieve a hierarchical ordering matrix that utilizes at least one parameter to control distribution of the resources. The processing circuit is configured to determine a preferred rail for distributing the resources based on an application of at last one parameter associated with at least one of the resources or the customer. The processing circuit is configured to initiate a distribution of the resources via the preferred rail.

A third example embodiment relates to a non-transitory computer readable medium storing instructions that, when executed by one or more processors, cause the one or more processors to: receive an indication of a closing of an account associated with a customer of a provider institution; subsequent to receipt of the indication, identify resources of the account; retrieve a hierarchical ordering matrix that utilizes at least one parameter to control distribution of the resources; determine a preferred rail for distributing the resources based on an application of at last one parameter associated with at least one of the resources or the customer; and initiate a distribution of the resources via the preferred rail.

These and other features, together with the organization and manner of operation thereof, will become apparent from the following detailed description when taken in conjunction with the accompanying drawings. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIG. 2 is a user interface that may be shown on the user device of FIG. 1, according to an example embodiment.

FIG. 3 is a user interface that may be shown on the user device of FIG. 1, according to another example embodiment.

FIG. 4 is a hierarchical ordering matrix, according to an example embodiment.

FIG. 5 is a flow diagram of a method of distributing resources, according to an example embodiment.

FIG. 6 is a flow diagram of a method of distributing resources, according to an example embodiment.

DETAILED DESCRIPTION

Figure 1:
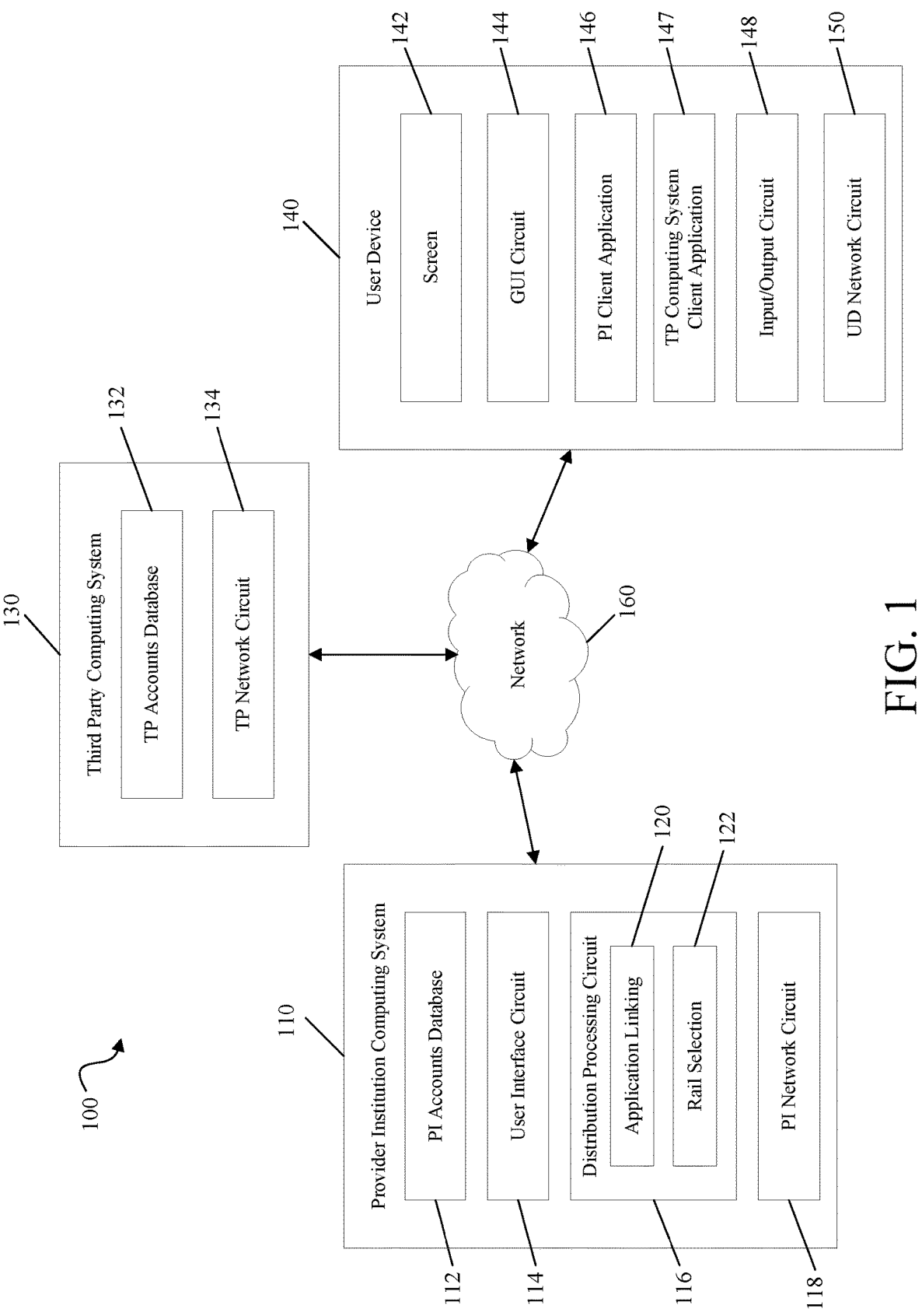
FIG. 1 is a block diagram of a computing system for distributing resources from an account, according to an example embodiment.

In the following detailed description, reference is made to the accompanying drawings, which form a part hereof. In the drawings, similar symbols typically identify similar components, unless dictated otherwise. The illustrative embodiments described in the detailed description, drawings, and claims are not meant to be limiting. It will be readily understood that the aspects of the present disclosure, as generally described herein, and illustrated in the figures, can be arranged, substituted, combined, and designed in a wide variety of different configurations, all of which are explicitly contemplated and made part of this disclosure. The terms "customer" and "user" are used interchangeably throughout the following disclosure.

Referring generally to the Figures, the systems, methods, and apparatuses described herein ease the administrative and technical burdens of distributing resources (e.g., funds such as cash, euros, etc.) from an account. In particular, the systems, methods, and apparatuses provide a variety of rail options (e.g., payment/transfer methodologies or means such as various payment networks, transfer rails, etc.) for completing a distribution, and facilitating the selection of a preferred rail based on the particular circumstances of the distribution.

A distribution of resources can be triggered for numerous reasons including, but not limited to, closing an account, distributing a dividend, and/or mortgage overages, among others. When resources in an account are to be distributed, the systems, methods, and apparatuses disclosed herein analyze various rail options and consider numerous factors to determine a preferred rail to use to complete the distribution. There are several types of rails available to complete a distribution including, for example, mailing a check, transferring resources between accounts at the same institution, using a third party application to transfer money to a different account, a blockchain rail, wiring the resources to another account via the automated clearing house (ACH)), among others. Each rail has benefits and drawbacks, and the systems, methods, and apparatuses disclosed herein analyze various factors to determine which one is best or likely best suited for the circumstances of the distribution. Some of the factors considered include an amount of the resources being distributed, a desired time to complete the distribution, a reliability of completing the distribution, an availability of a particular rail, a customer preference, a combination thereof and others.

In one exemplary embodiment, a customer decides to close an account that still contains resources (e.g., has money in it). As such, the resources need to be distributed in order to fully close the account. The customer may provide a customer preference of using a third party application (e.g., Zelle®) to perform the resources distributions from the account. Therefore, based on the customer preference, the system disclosed herein can consider Zelle® for transferring the resources in the account to another specified/designated account associated with the customer. However, the system verifies that the resources being distributed satisfy certain requirements of the Zelle® rail and that Zelle® is available to the customer. For example, if Zelle® has a maximum transfer limit of $50,000 and the resources to be distributed have a value of over $50,000, the system determines that the Zelle® rail is inapplicable and searches for a different rail to complete the distribution (e.g., Automated Clearing House (ACH) transfer, cash, etc.). In another example, if the customer preference indicates using Zelle®, but the customer never linked the Zelle® application with the provider institution account, the system determines a different rail to complete the distribution or prompt the customer to link the application to the account. If the system selects, identifies, or otherwise determines that a different rail is to-be-utilized, the system applies a hierarchical ordering matrix to determine the best rail for the situation. The hierarchical ordering matrix ranks the available rail options based on the circumstances of the distribution such that the system can determine the best rail option (e.g., the preferred rail) for the particular situation. In some embodiments, the distribution is automatic upon determination of the preferred rail. In other embodiments, the distribution requires prior approval from the customer.

The hierarchical ordering matrix defines a predetermined selection order for a plurality of rails that are available to use to execute a distribution of resources. The hierarchical ordering matrix provides a relative ranking of each of the plurality of rails such that a provider institution computing system can determine which rail is best to use for a distribution of resources and other factors of a particular situation. In one embodiment, the hierarchical ordering matrix may have a default order for the plurality of rails that does not consider any external information (e.g., account information). For example, the default order may be based solely on the data and statistics of the rails (e.g., efficiency, speed, success rate, etc.). This default hierarchical ordering matrix may be applied to all accounts associated with the provider institution. Prior to detecting a distribution initialization event (e.g., a request to close an account), account information can be compared with and applied to the hierarchical ordering matrix such that the hierarchical ordering matrix is modified to accommodate a particular account, and a particular distribution. The hierarchical ordering matrix may be continuously updating as the account information is updated. For example, when a value of resources within the account exceeds a maximum transfer amount of a rail, the rail may be removed from the hierarchical ordering matrix, or may be assigned a lower ranking. Similarly, as customer preferences are added, updated, or removed from the account, the hierarchical ordering matrix may be modified accordingly. For example, if a user adds a customer preference indicating a preference for a rail that can execute a distribution in real time, the hierarchical ordering matrix may assign a subset of the plurality of rails with a real time speed a relatively higher ranking than rails not associated with a real time settlement speed. The ranking within the subset may then follow the default order of the hierarchical ordering matrix. In some embodiments, the hierarchical ordering matrix may be modified upon the detection of the distribution initiation event based on the event that is detected. The custom modification of the hierarchical ordering matrix allows for distributions of resources from accounts to be performed efficiently and effectively. The provider institution computing system may refer to the hierarchical ordering matrix upon detection of a distribution initiating event and determine the preferred rail immediately or almost immediately since most of the relevant information has already been considered an evaluated by the provider institution computing system. This also minimizes the information that is needed to be collected from a customer at the time of the distribution thereby increasing the speed of the distribution.

The systems and methods disclosed herein facilitate an efficient distribution of resources by requiring little or no input from a user to select a rail that is best suited for each situation. For example, the system may rely upon a previously input customer preference and/or the hierarchical ordering matrix to determine a preferred rail for a distribution. This increases computer processing speeds and minimizes the amount of analysis that needs to be performed by the computer. For example, this takes away the guess work regarding how to contact a user, how to distribute the resources, etc. Furthermore, in some embodiments, the disclosure facilitates rapid account closures once resources from an account have been distributed. Subsequent to distributing resources from an account, the system may automatically delete or remove information associated with the account from a memory of the system. This minimizes the storage space used for customer accounts by eliminating information that is no longer applicable to, or associated with, an active account.

In some embodiments, the system provides an improved graphical user interface that provides the applicable information to the user associated with the account and allows the user to respond to the information without opening an application associated with a provider institution, opening any application, and/or unlocking/accessing the user device. For example, the system may transmit a notification to a user device to be displayed to the user when the user device is in a sleep or unopened state. The system may be configured to detect a dismissal of the notification (e.g., user swipes a notification from a locked screen), upon which the system may determine the user approved the distribution even though the user never opened an application or unlocked the user device. These and other features and benefits are described more fully herein below.

Referring now to FIG. 1, a block diagram of a system 100 for determining and executing a preferred rail for distributing resources (e.g., funds, cash, euros, etc.) from an account is shown, according to an exemplary embodiment. The system 100 includes at least one provider institution computing system 110 associated with a provider institution (e.g., a financial institution), at least one third party computing system 130 associated with a third party, and at least one user device 140 associated with a customer. The various systems and devices may be communicably and operatively coupled through a network 160, which may include one or more of the internet, cellular network, Wi-Fi, or any other type of wired or wireless network or a combination of wired and wireless networks.

The user device 140 may be a mobile device or any computing device associated with a user. In this configuration, the user is a customer of the provider institution. The user device 140 may be configured to exchange data over the network 160, execute software applications, access websites, generate graphical user interfaces, and perform other operations described herein. The user device 140 may include one or more of a smartphone or other cellular device, a wearable computing device, a tablet, a portable gaming device, a laptop, a desktop, a portable computing device, etc.

In some embodiments, the user device 140 includes a screen 142, a graphical user interface ("GUI") circuit 144, a provider institution client application 146, a third party computing system client application 147, an input/output ("I/O") circuit 148, and a user device network circuit 150. The user device network circuit 150 enables the user device 140 to connect to and to exchange information (e.g., data, signals, etc.) over the network 160. The I/O circuit 148 includes hardware and associated logic (e.g., modules, code, etc.) configured to facilitate exchanging information with a user and other devices. An input aspect of the I/O circuit 148 allows the user to provide information to the user device 140, and may include, for example, a keyboard, a touchscreen, a microphone, a camera, a sensor, a fingerprint scanner, or any user input device capable of engaging with the user device 140. An output aspect of the I/O circuit 148 allows the user to receive information from the user device 140, and may include, for example, a digital display, a speaker, illuminating icons, LEDs, among others. The I/O circuit 148 may include systems, components, devices, and apparatuses that serve both input and output functions, allowing the provider institution computing system 110 to exchange information with the user device 140. Such systems, components, devices, and apparatuses may include, for example, radiofrequency transceivers (e.g., RF or NFC-based transceivers, etc.) and other short range wireless transceivers (e.g., Bluetooth®, etc.)

The provider institution client application 146 and the third party computing system client application 147 can be structured to provide the user with access to services offered by the provider institution and the third party, respectively. In some embodiments, the applications 146, 147 are hard coded into the memory of the user device 140. In another embodiment, the applications 146, 147 are a web-based interface application, where the user accesses the web-based interface before usage, and the applications 146, 147 are supported by separate computing systems (provider computing system 110 and third party computing system 130, respectively) that transmit or provide the applications 146, 147 to the user device 140. In some embodiments, the applications 146, 147 may comprise a combination of web-based interface applications and hard coded applications. In some embodiments, one or more application programming interfaces (API) communicably couple the applications 146, 147.

The provider institution client application 146 is structured to permit management of at least one user account associated with the provider institution. Accordingly, the provider institution client application 146 can be communicably coupled with the provider institution computing system 110 via the network 160. Through this communicative coupling, the provider institution computing system 110 may be configured to provide displays regarding the particular provider institution service or provider institution client application 146 (e.g., account information, distribution preferences, etc.).

The third party computing system client application 147 is structured to permit management of at least one user account associated with a third party. Accordingly, the third party computing system client application 147 may be communicably coupled with the third party computing system 130 via the network 160. Through the communicative coupling, the third party computing system 130 may be configured to provide displays regarding the particular third party service or the second third party computing system client application 147.

In some embodiments, the provider institution computing system 110 may provide an API to the third party computing system client application 147 to communicably couple the provider institution client application 146 with the third party computing system client application 147. With the API, the provider institution computing system 110 may be configured to identify third party computing system client applications 147 used by the user device 140 that are associated with a financial application. For example, the API may comprise a list of key terms associated with financial application (e.g., Zelle®, Bank A, etc.). The provider institution computing device 110 may identify which applications used by the user device 140 include those key words and designate those applications as financial applications. The financial applications may be configured to be linked to the provider institution computing system 110 to facilitate disbursements of funds, as described in more detail below. In some embodiments, the user device 140 may include a plurality of third party computing system client applications 147. In such an embodiment, the provider institution computing system 110 may provide an API to communicably couple each of plurality of third party computing system client applications 147 with the provider institution client application 146.

The GUI circuit 144 of the user device 140 may be structured to present, control, and otherwise manage displays or graphical user interfaces on the user device 140. In some embodiments, the GUI circuit 144 may present, control, or manage information generated and stored by the provider institution computing system 110. For example, the provider institution computing system 110 may generate a user interface (e.g., via the client application 146) that facilitates the input of information pertaining to customer preferences. The provider institution computing system 110 may provide the user interface to a user device 140 to be displayed on the screen 142 via the GUI circuit 144. Input received by the screen 142 of the user device 140 may be transmitted to the provider institution computing system 110 via the GUI circuit 144. The provider institution computing system 110 may then process the information input by the user and store the information in a provider institution accounts database 112. In some embodiments, the provider institution computing system 110 provides a web browser configured to display a web-based user interface via the GUI circuit 144. Additional aspects of the interfaces that can be displayed on the user device 140 by the GUI circuit 144 are described further below.

In some embodiments, the GUI circuit 144 may be configured to present, control, and otherwise manage displays or graphical user interfaces on the user device 140 when the user device 140 is in an inactive state (e.g., sleep state, locked state, etc.). An inactive state of the user device 140 may provide the user limited access to the functionalities of the user device 140 (e.g., can only see a clock or access limited applications that do not require a user identification to access). An active state of the user device 140 may provide the user with access to all the functionalities of the user device 140 (e.g., can access all applications and tools that are accessible by the user device 140). In some embodiments, the screen 142 may present a display to a user when the user device 140 is in a locked state. Similarly, the I/O circuit 148 may be configured to receive an input when the user device 140 is in an inactive state and no applications have been accessed. For example, when a notification is transmitted to the user device 140 when in an inactive state, if the user dismisses (e.g., swipes the notification off the display screen) the notification, the I/O circuit 148 may detect such a dismissal. As explained in more detail below, the provider institution computing system 110 may be configured to receive a signal indicating the dismissal, and interpret the signal as, for example, an acceptance of a preferred rail.

The provider institution computing system 110 may be a computing system associated with an organization, such as a financial institution, that provides and maintains one or more accounts, which may include financial accounts, on behalf of the user. The provider institution may provide one or more products and/or services (e.g., providing and managing of accounts (e.g., credit accounts, mortgages, demand deposit accounts, etc.), lending, money transfers, issuing payment cards, wealth management, etc.). The associated provider institution is structured to provide one or more of these products and/or services to customer. As such, the provider institution may also be referred to as a financial institution herein that provides one or more financial products and/or services.

According to an exemplary embodiment, the provider institution computing system 110 includes at least one provider institution accounts database 112, at least one user interface circuit 114, at least one distribution processing circuit 116, and at least one provider institution network circuit 118. The provider institution network circuit 118 may be configured to enable the provider institution computing system 110 to exchange data over the network 160. In some embodiments, the user interface circuit 114 may facilitate the delivery of account information, customer preference information, or other information for display at the user device 140. The provider institution accounts database 112 may be configured to retrievably store user information relating to the various operations discussed herein. The provider institution accounts database 112 may include non-transient data storage mediums (e.g., local disk or hard-drives, etc.) or remote data storage facilities (e.g., cloud servers, etc.). The provider institution accounts database 112 may include personal information (e.g., names, address, phone number, etc.), customer preferences (e.g., a specified rail, alternate recipient, preferred factor to consider, etc.), authentication information (e.g., username/password, device authentication tokens, security questions, unique customer identifiers, etc.), and financial information (e.g., token information, account numbers, account balances, transaction history, etc.) relating to the various users and associated financial accounts.

The distribution processing circuit 116 is configured to identify resources in an account that are to be distributed. The distribution processing circuit 116 may be configured to receive instructions identifying specific events that indicate when resources in an account are to be distributed (e.g., a distribution initiating event). For example, the distribution processing circuit 116 may receive instructions indicating a request to close an account. The request to close an account may indicate a need to distribute resources within the account. In such an embodiment, upon detection or receipt of a request to close an account, the distribution processing circuit 116 may be configured to identify the resources in the account to be distributed. Another distribution initiating event may include having a predetermined amount of time pass with no or little activity on the account. For example, the distribution processing circuit 116 may receive instructions indicating that resources are to be distributed from an account after a predetermined amount of time. For example, the instructions may indicate distributing resources once every six months. Therefore, the distribution processing circuit 116 may detect that six months have passed since the previous distribution of resources and identify resources to be distributed based on the six months having passed. Another distribution initiation event may include the amount of resources in the account reaching a predetermined threshold. For example, the distribution processing circuit 116 may receive instructions indicating that a total value of resources in the account is to remain below a predetermined value. The distribution processing circuit 116 may detect the total value of resources in the account exceeds the predetermined value and identify resources to be distributed based on the value exceeding the predetermine value. Another distribution initiation event may include a mortgage overage. For example, the distribution processing circuit 116 may detect when a customer has contributed an excess amount to a mortgage and identify resources to be distributed based on the excess amount contributed. In other embodiments, the instructions may indicate an amount of resources to be distributed (e.g., certain percentage of the total resources in the account, a predetermined fixed amount, etc.). In some embodiments, the distribution processing circuit 116 is configured to notify a customer about a pending distribution. For example, the notification may explain the reason for the distribution (e.g., the distribution initiating event) and include distribution details (e.g., distribution amount, preferred rail, estimated distribution timeline, etc.).

The distribution processing circuit 116 is configured to analyze, determine, and execute a preferred rail for distributing the identified resources in the account. In some embodiments, the distribution processing circuit 116 includes an application linking circuit 120 and a rail selection circuit 122.

The application linking circuit 120 is configured to link external applications (or accounts) to a customer account associated with the provider institution. Linking an application to the account may allow resources (e.g., money) to be transferred from the account via the application without additional security checks to slow the distribution process down. For example, when linking the application to the account, the necessary credentials may be obtained at that time, such that when it is time to distribute resources, the method of doing so is already set up. Therefore, linking the application to the account reduces the time and energy it takes to complete a distribution. For example, the customer may have a checking account associated with the provider institution and an application associated with a third party. The third party application may include and/or be linked to a checking account with the third party (e.g., Venmo®, Zelle®, etc.). Linking the third party application with the account associated with the provider institution enables the third party application to facilitate a distribution of resources from the account associated with the provider institution. In some embodiments, the application linking circuit 120 is configured to prompt a user to provide credentials and other user information associated with one or both of the account and the application and store the credentials and information in the provider institution accounts database 112. For example, the application linking circuit 120 may be configured to generate a user interface to prompt a user to provide a user name and password associated with the third party application that the user wants to link to the account associated with the provider institution. In another embodiment, the application linking circuit 120 may be configured to provide, via a user interface displayed on a screen 142 of a user device 140, options to the user regarding what accounts or applications to link to the account associated with the provider institution. For example, the user interface may include links of the applications that are associated with financial platforms. The links may be configured to be selectable by a user. Based on a selection of a link of an application, the application linking circuit 120 may be configured to generate a second user interface comprising fields for the user to provide an input necessary to link the selected application to the account associated with the provider institution (e.g., user name and password for third party application account).

In some embodiments, the application linking circuit 120 may be configured to use an application program interface (API) to identify third party applications stored on or used by the user device 140 (e.g., can identify what applications have been downloaded onto or used by the user device 140). The API may be configured to determine which of those third party applications are associated with a financial platform. For example, the application linking circuit 120 may provide the API with a list of terms (e.g., key words, names of institutions or applications, etc.) that are associated with a financial platform (e.g., Zelle®, Bank A, etc.). The application linking circuit 120 may identify which of the applications on a user device 140 are associated with a financial platform by comparing application information (e.g., application name, owner of application, etc.) with the terms provided to the API. For example, the application linking circuit 120 may be configured to determine that the user of the user device 140 has an account with a money-transferring platform (e.g., Zelle®), a social media platform (e.g., Facebook), and a third party bank account (e.g., Financial Institution ABC which is a third party relative to the provider institution) based on the terms provided to the API. Based on the applications that have data that matches the terms, the application linking circuit 120 may be configured to suggest to the user to link some, all, or none of those applications to the account associated with the provider institution (e.g., provide a user interface listing each as an option to link).

In some embodiments, the application linking circuit 120 may generate a user interface listing the identified applications. In some embodiments, the application linking circuit 120 may generate a user interface listing a subset of the identified applications. For example, the application linking circuit 120 may obtain usage data related to the various applications detected. The usage data, for example, may indicate how many times the applications has been used, a frequency of use, or a most recent use. The application linking circuit 120 may determine the subset of the applications to display via the user interface based on which applications have usage data that satisfies a predetermined threshold. For example, the application linking circuit 120 may only list the applications that have been used within a predetermined time frame (e.g., within the past thirty days). In another example, the application linking circuit 120 may only list applications that have been used a predetermined number of times (e.g., application has been used at least five times). In another example, the application linking circuit 120 may only list applications that are used at a predetermined frequency (e.g., at least every month).

In some embodiments, the API of the provider institution computing system 110 may be configured to detect when an application is no longer on or associated with the user device 140. For example, a key term from the API that was originally detected is no longer detected. The application linking circuit 120 may receive a signal indicating the application is no longer an option to link to the provider institution computing system 110. Responsive to receipt of the indication, the provider institution computing system 110 may be configured to update a hierarchical ordering matrix so not include the application as a rail for distributions.

The rail selection circuit 122 is configured to receive, store, and evaluate data regarding various rails that may be used for distributing resources. In some embodiments, the rail selection circuit 122 is configured to receive a customer preference regarding rails. For example, a customer of a provider institution may provide preference criteria (e.g., a specific rail to use for distributions, a specific rail to not use for distributions, quickest rail, most reliable rail, etc.) to guide the distribution processing circuit 116 when selecting a preferred rail for future distributions. For example, the customer preference may indicate at least one of the preferred rail (e.g., customer wants to use a Wire Transfer), a rail that is not the preferred rail (e.g., customer does not want to use a Prepaid Card), a factor that is most important when selecting the preferred rail (e.g., customer prioritizes speed of rail over cost of the rail), and a recipient for the distribution (e.g., any distribution will be sent to a charity). The preferences may apply to all or some of future distributions. In other embodiments, different preferences apply to different distributions (e.g., a distribution for closing an account uses a first rail and a distribution for a mortgage overage uses a second rail). The rail selection circuit 122 may be configured to receive a customer preference at any time. For example, the rail selection circuit 122 may be configured to receive a customer preference upon opening a new account or a customer preference can be added, removed, or updated at any point when the account is open. The rail selection circuit 122 may store and update the provider institution accounts database 112 with the customer preference.

In another exemplary embodiment, the rail selection circuit 122 is configured to determine a preferred rail for a distribution. For example, the rail selection circuit 122 may be configured to compare a rail parameter of at least one rail with information associated with the resources to be distributed. A rail parameter may include, but is not limited to, a routing mechanism, a speed, a maximum distribution amount, and/or a cost of a rail. The information may include, but is not limited to, a quantity of resources and/or a distribution deadline. Based on the information matching or falling within the rail parameter of the rail, the rail selection circuit 122 can select the rail as the preferred rail. When there are a plurality of rails that the information matches or falls within, the rail selection circuit 122 can select among the plurality of rails based on a hierarchical ordering matrix of the rails. For example, the hierarchical ordering matrix can indicate a distribution via a third party application (e.g., Zelle®) is preferred over a real time payment (RTP) money transfer, which is preferred over an automated clearing house (ACH). In one embodiment, if the resources are transferrable by any one of the money transfer application, the RTP money transfer, and the ACH money transfer, the rail selection circuit 122 may choose the money transfer application as the preferred rail. The hierarchical ordering matrix may be different for different distributions. For example, the hierarchical ordering matrix may change based on the type of distribution (e.g., closing an account versus a mortgage overage), a customer preference (e.g., prioritizing speed of distribution over cost of transaction), a combination thereof, and so on. A more detailed explanation of how the preferred rail is determined is discussed below.

In some embodiments, the rail selection circuit 122 is configured to consider the customer preference when determining the preferred rail. Expanding on the example above, the customer preference can indicate that the customer does not want a distribution executed via a third party application. Therefore, the rail selection circuit 122 may exclude all third party application distribution rails and, for example, select the RTP money transfer rail based on other circumstances of the distribution. In other embodiments, the customer preference may include a plurality of parameters for the rail selection circuit 122 to consider when selecting a preferred rail.

Upon selection of the preferred rail, the distribution processing circuit 116 may be configured to execute the distribution via the preferred rail. The distribution processing circuit 116 may execute the distribution automatically upon selection of the preferred rail. In other embodiments, the distribution processing circuit 116 may require approval or acknowledgement by the customer prior to executing the distribution.

According to an exemplary embodiment, the third party computing system 130 may be a computing system associated with any third party. As used herein with respect to a third party computing system 130, "third party" refers to an organization or entity that is a third party relative to the provider institution. The third party may be used/partake in the distribution of resources from the customer's account.

For example, the third party may be another bank with an account to receive the distributed resources. In another example, the third party may be a money transfer application (e.g., Zelle®, Venmo®, etc.).

The third party computing system 130 may include a third party accounts database 132 and a third party network circuit 134. The third party network circuit 134 is configured to facilitate the exchange of data, information, values, and the like over the network 160. The third party accounts database 132 may be configured to retrievably store user information relating to the various operations discussed herein. The third party accounts database 132 may include non-transient data storage mediums (e.g., local disk or hard-drives, etc.) or remote data storage facilities (e.g., cloud servers, etc.). The third party accounts database 132 may include personal information (e.g., names, address, phone number, etc.), authentication information (e.g., username/password, device authentication tokens, security questions, unique customer identifiers, etc.), and financial information (e.g., token information, account numbers, account balances, transaction history, etc.) relating to the various users and associated third party accounts.

Referring now to FIG. 2, a user interface 200 that is shown on the user device 140 of FIG. 1 is depicted, according to an exemplary embodiment. The provider institution client application 146 may generate user interface 200. The user interface 200 may be provided to a user of the user device 140 to facilitate linking a third party computing system client application 147 to the account associated with the provider institution. The user interface 200 may be rendered on the user device 140 while the user device 140 is accessing the provider institution client application 146 associated with the provider institution. The user interface 200 may be accessed by the user when opening an account with the provider institution. In other embodiments, the user interface 200 is accessible by the user at any time while the user has an account associated with the provider institution. The user interface 200 may include information regarding the account associated with the provider institution to which an application may be linked. The user interface 200 may also include information regarding the purpose of the user interface 200 (e.g., a title of the user interface 200, instructions on how to interact with/manipulate the user interface 200, etc.). The user interface 200 may display at least one third party computing system client application 147 capable of being linked to the account associated with the provider institution. The third party computing system client application 147 may be displayed in any format (e.g., via a name of the application or via an image representative of the application, e.g., a company logo or icon). The user interface 200 may also display a plurality of third party computing system client application 147 capable of being linked to the account associated with the provider institution. The provider institution client application 146 may organize the third party computing system client applications 147 in a list. In another embodiment, the provider institution client application 146 arranges the third party computing system client applications 147 in rows and/or columns, or in any other intentional arrangement. In another embodiment, the provider institution client application 146 arranges the third party computing system client applications 147 randomly on the screen 142 of the user device 140. The third party computing system client applications 147 displayed on user interface 200 may be determined based on applications or accounts detected to have been previously used by the user device 140.

The user interface 200 may display all of the detected applications, or only a subset of the detected applications. For example, the provider institution client application 146 via an API may detect Application A, Application B, and Application C as applications that have been previously accessed by or downloaded to the user device 140. The provider institution client application 146 may then generate user interface 200 with each of Application A, B, and C as options to link to the account. In other embodiments, only a subset of the detected applications may be displayed on the user interface 200. The applications that are displayed on the user interface 200 may be based on various factors (e.g., alphabetical, frequency of use by the user, most common applications linked by other customers, already linked to the account, etc.). For example, the API of the provider institution client application 146 may detect how many times a user of the user device 140 has used each of Applications A, B, and C. The provider institution client application 146 may be programmed to display only applications that have been used a predetermined number of times (e.g., display only applications that have been accessed at least ten times). In another example, the provider institution client application 146 may be programmed to display only applications that have been used within a predetermined amount of time (e.g., display only applications that have been used within the last week). In some embodiments, the provider institution computing system 110 may detect the applications on the user device 140 and generate the user interface 200, for example, when a user is accessing a web interface.

In some embodiments, the user interface 200 includes at least one interaction point. An interaction point may be any point on the user interface 200 configured to receive input from a user (e.g., toggle switches, buttons, text fields, etc.). For example, the "Application" buttons 202 on the user interface 200 may be interaction points. The "Application" buttons 202 may be configured to be selectable by the user. When selected, the provider institution client application 146 may generate a new user interface configured to receive input from the user. For example, if the user selects the "Application A" button 202, the provider institution client application 146 may generate a new user interface prompting the user to provide authentication information (e.g., username, password, etc.) for an account associated with Application A. In such an embodiment, the user can link an account associated with Application A with the account associated with the provider institution without leaving the provider institution client application 146.

In some embodiments, there are more applications capable of being linked to the account associated with the provider institution than are displayed on one user interface. In such an embodiment, the user interface 200 may be configured to be manipulated by a user such that the user can scroll through (e.g., move applications on the user interface vertically) or swipe through (e.g., move applications on the user interface horizontally) the plurality of applications until the user finds the one the user wants to link. In another embodiment, the user interface 200 includes an interaction point, shown as an "Other" button 204. Selection of the "Other" button 204 can cause additional applications to be displayed on the screen 142 of the user device 140. In one embodiment, responsive to a user selecting the "Other" button 204, the provider institution client application 146 is configured to generate a new user interface. The new user interface may display the additional applications that were not on the user interface 200. In some embodiments, the new user interface includes a field for a user to input information corresponding to another third party application (e.g., name of application, routing number of bank account associated with a third party bank, etc.) that was not displayed on the user interface 200. Based on the input, the user interface may display one or more other applications related to the input provided. In another embodiment, responsive to a user selecting the "Other" button 204, the provider institution client application 146 is configured to provide a list of the additional applications on the same user interface 200 (e.g., a drop-down menu).

In some embodiments, the user interface 200 provides an interaction point, the selection of which indicates that any information received via the user interface 200 can be transmitted to and saved in the provider institution accounts database 112, shown as the "SUBMIT" button 214. For example, after selection of an application to link, the user may select the "SUBMIT" button 214. Selection of the "SUBMIT" button 214 may cause the any information associated with the linked application to be sent to and stored by the provider institution accounts database 112 of the provider institution computing system 110.

In some embodiments, the user interface 200 may provide an interaction point configured to end an application linking process when selected. For example user interface 200 may include a "SKIP" button 216. Selection of the "SKIP" button 216 indicates that the user does not want to link a third party application to the account associated with the provider institution, at least at the current time. The "SKIP" button 216 is configured to close the user interface 200 upon selection. However, in some embodiments, the provider institution client application 146 may generate a verification message to be displayed on the user interface 200 prior to closing the user interface 200. For example, if a user selects the "SKIP" button 216, the provider institution client application 146 generates and displays a message verifying the user's intent to forego linking a third party account to the account associated with the provider institution.

Referring now to FIG. 3, a user interface 300 that is shown on the user device of FIG. 1 is depicted, according to an exemplary embodiment. The provider institution client application 146 may generate user interface 300 to be presented to a user of the user device 140 to facilitate the determination and input of a customer preference. The user interface 300 may be rendered on the user device 140 while the user device 140 is accessing the provider institution client application 146. The user interface 300 may be accessed by the user when opening an account with the provider institution. In other embodiments, the user interface 300 is accessible by the user at any time while the user has an account associated with the provider institution. The user interface 300 may include information regarding the account associated with the provider institution to which any preferences may be applied. The user interface 300 may also include information regarding the purpose of the user interface 300 (e.g., a title of the user interface 300, instructions on how to interact with/manipulate the user interface 300, etc.).

In one embodiment, the user interface 300 is configured to facilitate the input of a customer preference regarding a distribution. The user interface 300 may include at least one preference prompt 302. In some embodiments, the user interface 300 includes a plurality of preference prompts. In other embodiments, the user interface 300 includes an interaction point configured to generate additional preference prompts, shown as "ADD" button 304.

According to an exemplary embodiment, the preference prompt 302 provides a user with at least one field to input/provide a customer preference. In some embodiments, the user can populate the field with predetermined options supplied by the provider institution client application 146. For example, the preference prompt 302 may comprise at least one list, drop down menu, selectable icon, etc. providing the predetermined options to the user. In other embodiments, the user manually inputs the customer preference. For example, the preference prompt 302 may comprise a text field for a user to input text, numbers, symbols, images, etc. In one embodiment, the provider institution client application 146 and/or the provider institution computing system 110 provides a plurality of preference options regarding distribution rails. The preference options may be categorized by type. For example, the types may include, among others, specific rail and rail parameter. Selection of the specific rail type may indicate that the user wants the preferred rail for a distribution to be a specific rail. Selection of the rail parameter type may indicate that the user wants the preferred rail for the distribution to be selected based on a specific rail parameter. In one embodiment, the user interface 300 includes an interaction point for the user to select a preference type, shown as "Type" field 306. Selection of the "Type" field 306 may cause the type options to be displayed (e.g., a drop down list). In another embodiment, a user can continue to select the "Type" field 306 to toggle the selected type between the options until the desired type is displayed.

In some embodiments, each preference type includes a plurality of options. For example, the specific rail type includes a plurality of rails to choose from including, but not limited to, intra-institution transfer (e.g., between accounts at the same institution), third party applications (e.g., Zelle®, Venmo®, CashApp, etc.), RTP money transfers, FedNow, Original Credit Transfer (OCT), wire transfer, cashier's check, Positive Pay Check, prepaid card, and cash. The rail parameter type includes a plurality of parameters regarding the plurality of rails to choose from including, but not limited to cost, speed, and/or reliability. In some embodiments, the user interface 300 provides an interaction point for the user to select the desired option based on the selected preference type, shown as "Selection" field 308. If the specific rail type is selected, selection of the "Selection" field 308 may cause the provider institution client application 146 to display the rail options and allow the user to select at least one of the rail options. If the rail parameter type is selected, selection of the "Selection field" 308 may cause the provider institution client application 146 to display the parameters and allow the user to select at least one of the parameters. The plurality of options for the preference type may be, for example, provided to the user via a dropdown menu. In one embodiment, if the user selects the specific rail type and then selects a rail that corresponds to a third party application that must be linked to the account associated with the provider institution in order to execute a distribution, the selection of said rail may automatically cause the provider institution client application 146 to generate user interface 200 such that the user can link the appropriate application to the account. In other embodiments, the rail selection circuit 122 may prevent the user from selecting a rail that requires a linked application until the application is linked. In some embodiments, the user may select a plurality of rails for the provider institution computing system 110 to choose from, or can select a plurality of rails that the provider institution computing system 110 cannot choose from when selecting a preferred rail.

In other embodiments, the "Selection" field 308 is configured to allow the user to indicate which options to not use.

For example, the user can indicate to the distribution processing circuit 116 to not use a RTP money transfer for a distribution, which, in turn, means the distribution processing circuit 116 can use any of the other options.

According to an exemplary embodiment, the user interface 300 includes an interaction point enabling the user to define/designate when the distribution processing circuit 116 of the provider institution computing system 110 is to apply the customer preference, shown as the "Distribution" field 310. Resources may be distributed from an account for a variety of reasons. The types of distributions may include an account closure, mortgage overage, dividend, among others. The user may want the customer preference to apply to all distributions. In another embodiment, the user may want the customer preference to apply to only a subset of distributions (i.e., less than all types of distributions). For example, the user may want to use an ACH money transfer when closing an account, but use an OCT for all other distributions. In such an embodiment, the user selects the preferred rail type by selecting the "Type" field 306, selects the ACH money transfer by selecting the "Selection" field 308, and selects the closing an account option by selecting the "Distribution" field 310. In some embodiments, the user can select a plurality of distribution types via the "Distribution" field 310 if the user wants the preference to apply to the plurality of distribution types.

In another embodiment, the user interface 300 includes an interaction point for the user to use to indicate whether the user wants to receive a notification of the pending distribution prior to the actual distribution, shown as the "Require Notice" field 312. In some embodiments, selecting the "Require Notice" field 312 can toggle the preference between yes and no. In other embodiments, the user can define the notification preference for each distribution type selected. For example, the user may require prior notification for an account closure distribution, but may not require prior notification for a dividend distribution. When the customer preference indicates the user wants a notification prior to the distribution of the resources, the user may determine whether transmitting a notice is enough or whether the user must provide an input prior to initiating the distribution. For example, the customer preference may indicate that the distribution may initiate automatically after transmitting a notice to the user. In another embodiment, the customer preference may indicate the distribution processing circuit 116 must detect some acknowledgement of the user (e.g., detect an email has been opened or the notification has been dismissed) prior to initiating the distribution. In another embodiment, the customer preference may indicate the distribution processing circuit 116 must receive an approval from the user prior to initiating the distribution. In another embodiment, the customer preference may indicate the distribution processing circuit 116 may initiate the distribution after a certain amount of time has passed since a designated event. The event may be a transmission of a notification, a receipt of an approval, etc.

In some embodiments, the fields 306, 308, 310, 312 displayed on user interface 300 are configured to receive a manual input from the user if a desired preference is not an option displayed on the user interface 300. For example, if the only rails listed as options include RTP, ACH, and wire transfer, but the user wants a cashier's check, the user can manually (e.g., via an input device of the user device 140) input "cashier's check" as the preference. Whenever an input by a customer is new to the provider institution computing system 110 (e.g., was not previously a selectable option), the provider institution computing system 110 can store the input in the provider institution accounts database 112 and then make that a selectable option for the customer in the future. In some embodiments, the provider institution computing system 110 may apply that option to all other customer accounts as well, and make it a selectable option for all customers in the future. This allows the provider institution computing system 110 to automatically update with new rail options as new options are developed and become available. This may be applied to all fields described herein. When a user inputs a value that was not previously provided as a selectable option, the provider institution accounts database 112 may store the value and the provider institution client application 146 may generate the value as a selectable option in the future. Therefore, as new parameters are developed, new events indicating a need for a distribution arise, as new applications are created, etc., the provider institution client application 146 may add those options to the selectable options provided in the generated user interfaces.

In some embodiments, the "ADD" button 304 is configured to allow a user to add additional preferences. The additional preferences may be applied to the same distribution type. For example, a first preference can indicate using the speed parameter to determine the preferred rail and a second preference can indicate using the cost parameter to determine the preferred rail. Therefore, if there are multiple rails that provide real time transfer capabilities, the rail selection circuit 122 then identifies which rail costs less to execute. If the costs are the same, the rail selection circuit 122 searches a repository (e.g., local memory of user device and/or database of provider institution computing system) for additional customer preferences. However, if there are none, the rail selection circuit 122 can determine the preferred rail based on the hierarchical ordering matrix discussed in more detail below. If the provider institution computing system 110 receives more than one preference via the provider institution client application 146 and the preferences conflict, the rail selection circuit 122 may select which one to apply first depending on a priority of the preferences. For example, with multiple preferences, the preferences may have a default priority order based on the order in which the preferences were input into the system. In some embodiments, the user may rearrange the order of priority of the preferences (e.g., apply a priority number to the preferences, drag and drop the preferences into a desired order via the screen 142 of the user device 140, etc.).

In some embodiments, the user interface 300 includes an interaction point, the selection of which indicates the user is done or finished inputting a customer preference and that the customer preference can be transmitted to the provider institution accounts database 112 of the provider institution computing system 110, which in this example is shown as "SUBMIT" button 314. When the user has input all desired customer preferences, the user Selecting the "SUBMIT" button 314 can cause the customer preference information input by the user to be sent and stored in the provider institution accounts database 112 of the provider institution computing system 110.

In some embodiments, the user interface 300 may provide an interaction point configured to end the customer preference input process when selected. For example user interface 300 may include a "SKIP" button 316. Selection of the "SKIP" button 316 indicates that the user does not want to provide any customer preferences, at least at the current time. The "SKIP" button 316 is configured to close the user interface 300 upon selection. However, in some embodiments, a verification message may be displayed on the user interface 300 prior to closing the user interface 300. For example, if a user selects the "SKIP" button 316, a message verifying the user's intent to forego inputting customer preferences related to distribution rails may be displayed.

In some embodiments, some of the interaction points displayed via the user interface 300 are configured to be non-selectable until another field has already received input from the user. For example, the provider institution client application 146 may configured the "Selection" field 308 to be non-selectable until the user provides input for the "Type" field 306. In another example, the provider institution client application 146 may not display the "Selection" field 308 on the user interface 300 until the "Type" field 306 receives an input from the user. In another embodiment, each selection field may be displayed on a separate user interface such that the provider institution client application 146 guides the user through the steps in a predetermined order. For example, a first user interface may prompt the user to select a Type. Upon selection of a Type, the provider institution client application 146 may be configured to generate a second user interface that may prompt the user to select a Selection, based on the Type selected on the first user interface. The provider institution client application 146 may generate as many interfaces as necessary to guide the user through as many steps as necessary to create the desired customer preference(s).

According to an exemplary embodiment, the user interface 300 includes an interaction point configured to display information regarding the plurality of available rails when selected, shown as "Rail Information" button 318. Selecting the "Rail Information" button 318 may cause the provider institution client application 146 to generate a new user interface to be displayed. In other embodiments, selecting the "Rail Information" button 318 causes the provider institution client application 146 to generate a pop-up window to appear on the user interface 300. A rail information display may include a list of available payments including at least one of a rail name for each rail, a description of each rail (e.g., how resources are routed), how fast resources are transferred, maximum transfer amounts, a cost to use the rail, or miscellaneous notes, among others, and any combination thereof.

In other embodiments, the user interface 300 includes other variables to consider when determining customer preferences for a distribution. For example, a user may want to specify a recipient for a distribution. A default setting may indicate that a distribution from an account is to be sent to the owner of the account, or to another account associated with the owner of the account. In this example, the user may identify a different recipient. The recipient may be a different person or an organization (e.g., business, charity, etc.). In some embodiments, the user interface 300 provides the option to direct the distribution to a different recipient. For example, the user interface 300 includes a list of charities that can be recipients of the distribution. The list may be, for example, based on organizations previously used as recipients by the customer or other customers of the provider institution, organizations that are located near the customer, or organizations that the provider institution computing systems determines may be of interest to the user (e.g., based on information provided by the user, information from a linked account, etc.). In other embodiments, the user interface 300 provides an interaction point such as a text field for the user to input such preferences. Responsive to an indication of a recipient being a person or organization other than the owner of the account, the provider institution client application 146 may generate another user interface to prompt the user to provide recipient details such that a distribution may be completed (e.g., mailing address, account number, etc.). In other embodiments, the distribution may also be split amongst more than one recipient. For example, a first portion of the resources may go to a first recipient and a second portion of the resources may go to a second recipient. The provider institution computing system 110 or the provider institution client application 146 may provide interaction points on the user interface for the user to define the number of recipients, select the specific recipients, and determine the proportion of the resources to be allocated to each recipient.

When establishing a recipient of a distribution of resources, the provider institution client application 146 may transmit the information of the recipient to be stored in the provider institution accounts database 112. In one embodiment, the provider institution client application 146 may generate a user interface comprising at least one field prompting a user to input recipient information, including but not limited to, name, address, email, phone number, bank account information, etc. of the recipient. In another embodiment, the provider institution computing system 110 or the provider institution client application 146 may be configured to obtain the recipient information automatically based on a relative location between a customer user device and a recipient user device. For example, the provider institution client application 146 may generate a user interface comprising an option for automatic retrieval of recipient information. In some embodiments, the option may need to be selected by the customer. In other embodiments, having the user interface displayed on a screen of the user device may automatically activate the automatic information retrieval upon detection of the user device being within a certain proximity to the recipient. In some embodiments, the provider institution client application 146 may detect that the customer user device is touching the recipient user device (e.g., initiation based on user devices touching or nearly touching/contacting each other such as a NFC protocol). Upon entering the proximity or touching of the two user devices, an API of the provider institution client application 146 may automatically read the recipient information from the recipient user device. For example, the provider institution client application 146 may read information regarding name, address, email, phone number, bank account information, etc. of the recipient. In some embodiments, the provider institution client application 146 generates a user interface to display on the recipient user device. The user interface may include a request for the information needed in order to set up the recipient for the distribution. The user interface may include details regarding what information the provider institution client application 146 wants to obtain and may include options to allow or deny the request. The provider institution computing system 110 may be configured to receive an allowance from the recipient user device. Upon receipt of the allowance, the provider institution client application 146 may pull the information from the recipient user device and complete the registration of the recipient for the distribution. The use of a tap exchange or contactless communication between the user device and recipient device adds security to a subsequent distribution process.

In another exemplary embodiment, the user interface 300 is configured to provide the user the ability to make conditional preferences. For example, the user may indicate that if the resources subject to distribution have a value less than a predetermined value, the distribution should be sent to a charity. However, if the value of the resources subject to distribution are equal to or more than the predetermined value, the distribution should be sent to the user. The user may indicate more than one threshold value, wherein each threshold value indicates a different recipient. In some embodiments, the user interface 300 may provide a set of fields to receive the conditional preference. For example, a first field may be configured to define a recipient. A second field may be configured to define the circumstances under which the recipient receives the distribution (e.g., the total value of the resources being distributed is less than $100). When there is more than one recipient for a single circumstance, a third field may be configured to identify the proportion of the resources for each recipient. Additional sets of fields may be provided by the provider institution computing system 110 via the user interface 300 if more circumstances are to be defined (e.g., recipients when the value of the resources is $100-$200, recipients when the value is $200-$300, etc.).

Referring now to FIG. 4, a hierarchical ordering matrix 400 is shown, according to an exemplary embodiment. The hierarchical ordering matrix 400 may include a variety of information related to the rails available to use for distributions. For example, the hierarchical ordering matrix 400 may include a plurality of rails. The hierarchical ordering matrix 400 may include information related to each of the plurality of rails including, but not limited to, rank (order of the rails based on which rails the provider institution computing system 110 determines to be the most advantageous for the distribution), routing method (how the resources are transferred, e.g., token based, physical transfer, etc.), speed (how long it takes to complete the disbursement), maximum transfer amount (dollar limit to disbursement), cost (cost to use the rail), other notes, etc. The hierarchical ordering matrix 400 may include more or fewer rails, more or less information, etc. In some embodiments, the hierarchical ordering matrix 400 indicates a predetermined selection order. For example, the order in which the rails are listed may indicate the preferred order in which the provider institution computing system 110 would select a preferred rail for a distribution, notwithstanding other customer information, resource information, customer preferences, etc. For example, if there were no other limitations set on a distribution, the provider institution computing system 110 may select the "Transfer" rail, according to the hierarchical ordering matrix 400 since the "Transfer" rail is ranked 1. However, the order of the predetermined selection order and the rails listed on the hierarchical ordering matrix 400 can change based on various factors, including but not limited to, customer information, resource information, and customer preferences. For example, if the customer preference indicates the customer does not want to use a rail that includes physical delivery (e.g., mail), the hierarchical ordering matrix 400 may not include cashier's check, positive pay check, prepaid card, and cash as rail options (e.g., remove from list, grey-out, move to bottom of list, give lower ranking/higher number, etc.). Further, if the resource information indicates that the value of the resources being distributed is above a predefined limit (e.g., $75,000), the hierarchical ordering matrix 400 may not include OCT as a rail option. Even further, if the provider institution computing system 110 has no customer information regarding a Zelle® account, the predetermined selection order may not include Zelle® as a rail option. Therefore, the predetermined selection order for this particular customer may only include Transfer, RTP, FedNow, and Wire Transfer. Any combination of factors can be used to determine the hierarchical ordering matrix 400 that works for the customer's specific circumstances. This can reduce the time and energy the provider institution computing system 110 uses to determine the preferred rail, since the options are already minimized based on prior inputs received from the customer.

The hierarchical ordering matrix 400 may also improve the process of determining a preferred rail for a distribution by consolidating the information used to determine the appropriate preferred rail. Instead of having to individually access or analyze all the different account information that affects the preferred rail determination (e.g., customer preferences, customer information, linked applications, rail parameters, etc.), the hierarchical ordering matrix 400 may be a consolidated representation of all the account information. Therefore, the computing system may only need to access the hierarchical ordering matrix 400 when determining the preferred rail, rather than access each piece of account information individually.

Referring now to FIG. 5, a flow diagram of a distribution method 500 for distributing resources from an account is shown, according to an exemplary embodiment. The method 500 may be implemented or performed by one or more of the components described above. As a brief overview, at step 502, a provider computing system may receive an indication of a distribution initiating event. At step 504, the provider computing system may identify resources of the account. At step 506, the provider computing system may retrieve a hierarchical ordering matrix. At step 508, the provider computing system may compare the hierarchical ordering matrix with account information. At step 510, the provider computing system may determine a preferred rail. At step 512, the provider computing system may initiate a distribution of the resources.

Prior to process 502, an account for a customer is created. Creating an account can include receiving, by the provider institution computing system 110, an indication from a customer to create an account. The indication may be from a user device 140 associated with the customer via the provider institution client application 146 or a web interface. The provider institution computing system 110 or the provider institution client application 146 can generate a user interface to prompt the customer to input customer credentials to associate with the account. For example, the user interface can provide fields for the user to input a username and password. When using a web interface, the provider institution computing system 110 can transmit the user interface to the user device 140 of the customer. The provider institution computing system 110 can receive the input from the customer and store the received customer credentials in the provider institution accounts database 112. Responsive to receiving the customer credentials, the provider institution computing system 110 can generate a new user interface to prompt the customer to link an application to the account. Further details on linking an application to the account are discussed below. The provider institution computing system 110 may receive an input from the customer via the user device 140 indicating a selection of an application to link to the account. Responsive to receiving the input indicating the selection of an application to link, the provider institution computing system 110 may link the application to the account.

When using the provider institution client application 146, the provider institution client application 146 may generate the user interface to receive the input from the customer and transmit to the provider institution computing system 110 to store in the provider institution accounts database 112. Responsive to receiving the customer credentials, the provider institution client application 146 can generate a new user interface to prompt the customer to link an application to the account. Responsive to receiving the input indicating the selection of an application to link, the provider institution client application 146 may link the application to the account.

In some embodiments, linking an application to an account includes the application linking circuit 120 of the provider institution computing system 110 linking the application to the account. Linking the application to the account may be done during the creation of the account, or at another time while the account is active. Linking an application to an account may include the application linking circuit 120 causing the provider institution client application 146 to generate a user interface to be displayed on the screen 142 the user device 140 associated with the customer. For example, the provider institution client application 146 can generate user interface 200. Generating user interface 200 can include displaying a plurality of third party computing system client applications 147 capable of being linked to the account. The plurality of third party computing system client applications 147 displayed may be random or may be selected based on certain criteria. For example, the plurality of third party computing system client applications 147 can be the third party computing system client applications 147 that are most commonly linked to accounts associated with the provider institution. In other embodiments, the plurality of third party computing system client applications 147 displayed may be applications that the provider institution client application 146 detects have been previously accessed or used by the user device 140. For example, generating user interface 200 may include detecting a plurality of third party computing system client applications 147 that have been accessed by (e.g., downloaded by, etc.) a user device associated with the customer. For example, the provider institution client application 146 can detect other third party computing system client applications 147 used by the user device via an API. The provider institution client application 146 may display the detected third party computing system client applications 147 on the user interface 200. In another embodiment, the provider institution client application 146 may determine a subset of the plurality of third party computing system client applications 147 to be displayed. The subset can include at least one third party computing system client application 147 that meets a predetermined threshold. For example, the subset may include an third party computing system client application 147 that has been accessed by the user device 140 a predetermined amount of times, has been accessed within a predetermined time period, etc. The provider institution client application 146 may generate a user interface 200 that displays the subset of the plurality of third party computing system client applications 147. In some embodiments, the third party computing system client applications 147 displayed on user interface 200 can be based on what applications are already linked to the account. For example, Application A may already be linked to the account, and therefore, user interface 200 may not display Application A as an option to be linked. Based on the aforementioned criteria, the provider institution client application 146 may generate a user interface with a selection of third party computing system client applications 147 that is tailored specifically for the customer. Therefore, the customer can easily link applications of interest to the account without having to scroll through lists of applications that the customer has never used, likely does not want to link, etc., or opening the applications themselves.

Upon determining which third party computing system client applications 147 to display on the user interface 200, whether random or tailored toward the customer, the provider institution client application 146 can display the user interface 200 via the user device 140 associated with the customer. Via the user interface of the user device 140, the provider institution client application 146 can receive an input from the customer via the user device 140 indicating a selection of at least one third party computing system client application 147 to link to the account. The provider institution client application 146 can transmit the input to the provider institution computing system 110. Responsive to the provider institution computing system 110 receiving the input, the application linking circuit 120 can prompt the user to provide application credentials associated with the application to be linked to the account. For example, the application linking circuit 120 may automatically open the third party computing system client application 147 on the user device 140. The third party computing system client application 147 may be opened independently of a provider institution client application 146, or the third party computing system client application 147 may be opened within the provider institution client application 146. The customer may input application credentials via the third party computing system client application 147. In other embodiments, the third party computing system client application 147 may never be opened, but instead the provider institution client application 146 receive the application credentials directly. The application linking circuit 120 may receive the application credentials. Responsive to receipt of the application credentials, the application linking circuit 120 may transmit a verification request to a third party computing system 130 associated with the third party computing system client application 147. The verification request is to verify the customer has authorization to use the third party computing system client application 147 (e.g., has an account with the third party computing system 130 associated with the application). The application linking circuit 120 may receive a confirmation from the third party computing system 130 indicating the account credentials match credentials stored in the third party accounts database 132. Responsive to receipt of the confirmation from the third party computing system 130, the application linking circuit 120 can save the application credentials in the provider institution accounts database 112. With the application credentials stored in the provider institution accounts database 112, the provider institution computing system 110 can execute a distribution in fewer steps since the provider institution computing system 110 no longer has to receive credentials to access the third party computing system client application 147.

In another example, the application linking circuit 120 may receive a denial from the third party computing system 130 indicating the account credentials do not match the credentials stored in the third party accounts database. Responsive to receipt of the denial, the application linking circuit 120 may again prompt the user to provide account credentials associated with the third party computing system client application 147. The application linking circuit 120 can continue to prompt the user to provide account credentials associated with the third party computing system client application 147 until application linking circuit 120 receives the confirmation. In other embodiments, the application linking circuit 120 is limited to prompting the user a predetermined number of times. For example, after receiving five denials from the third party computing system 130, the application linking circuit 120 can cause user interface 200 to re-appear on the user device 140, prompting the user to select a different application to link to the account. In some embodiments, the first application for which the application linking circuit 120 received five denials is no longer an option for the user to select to link to the account. For example, responsive to receiving a predetermined number of denials from a third party computing system 130 associated with an application, the application linking circuit 120 may prevent the customer from linking the application to the account. The application linking circuit 120 may provide an override option such that the customer can have another chance to link the application to the account. For example, the override function may be a certain amount of time (e.g., customer can try again after 24 hours), customer must call the provider institution to regain the option to link the application, etc.

After opening an account for the customer, at step 502 the provider institution computing system 110 can detect a distribution initiating event. For example, at step 502, the provider institution computing system 110 can receive an indication of an account closure. Other distribution initiating events can include identifying an overpayment into a mortgage escrow (e.g., money should be returned), determining predetermined amount of time has passed (e.g., a distribution schedule), determining an amount of resources in the account has reached a predetermine threshold (e.g., determined account balance threshold), identifying a dividend to be paid out, among others.

At step 504, responsive to detecting a distribution initiation event, the provider institution computing system 110 may identify resources in an account for distribution. The resources represent the remaining resources (e.g., money) in the account. In some embodiments, the provider institution computing system 110 identifies the resources to be distributed. In some embodiments, identifying resources to be distributed includes identifying which of the resources in the account are to be distributed. The resources to be distributed may be based on various factors. In one embodiment, the resources to be distributed is based on the event detected by the provider institution computing system 110. For example, if the provider institution computing system 110 detects a request to close an account (e.g., an explicit instruction to close the account via the client application 146), the provider institution computing system 110 can determine that all of the resources in the account are to be distributed. In other embodiments, the amount of resources is based on previously received instructions. For example, a user may provide instructions to the provider institution computing system 110 indicating that the balance of the account should remain below a predetermined threshold value. Therefore, when the account reaches a balance above the predetermined threshold, the amount of resources to be distributed may be at least as much as the difference between the predetermined threshold and the account balance. In another example, the instructions may indicate a certain fixed amount to distribute from the account on a predetermined schedule (e.g., distribute $1,000 every three weeks). Any instructions provided to the provider institution computing system 110 may be a part of the customer preferences provided by the user, as described in more detail below. The instructions may be stored in the provider institution accounts database 112 such that the instructions are selectively retrievable by the provider institution computing system 110.

Step 504 may also include notifying a customer of a pending distribution of the resources. For example, responsive to detecting an event that indicates that resources should be transferred from the account, the provider institution computing system 110 may transmit a notification to a user device associated with the owner of the account. For example, the notification may be an email, a text, a push notification, a push within the provider institution client application 146, etc. that is displayed on a screen 142 of a user device 140 associated with the owner of the account. The notification may include details of the pending distribution (e.g., amount, estimated execution date, etc.). The notification may also include account information (e.g., account number, account balance, customer preferences, etc.). The notification may also include an acknowledgement request that prompts the owner to acknowledge that the notification was received. For example, the notification may include a button, a signature line, a toggle switch, etc. configured to receive input from the owner of the account indicating the acknowledgement of the notification. The notification maybe configured such the customer can access the notification via the provider institution client application 146. The notification may be configured such that accessing the provider institution client application 146 is enough to indicate an acknowledgement (e.g., no affirmative acknowledgement from the customer is required). In other embodiments, acknowledgement may be displayed on a lock screen or a home screen of the user device such that a dismissal of the notification indicates an acknowledgment and the provider institution client application 146 does not need to be accessed to acknowledge the notification.

Upon receipt of the acknowledgement, the provider institution computing system 110 may continue with the distribution. In another embodiment, if the provider institution computing system 110 does not receive an acknowledgement, the provider institution computing system proceeds by at least one of sending a follow-up notification, proceeding with the distribution, and cancelling the distribution. For example, if the provider institution computing system 110 does not receive the acknowledgement, after a predetermined amount of time the provider institution computing 110 system may proceed with the distribution. In another example, the provider institution computing system 110 may provide a plurality of follow-up notifications. Responsive to sending a certain number of follow-up notifications, the computing system may cancel the distribution.

At step 506, the computing system retrieves a hierarchical ordering matrix 400. The hierarchical ordering matrix 400 represents a default order in which rails available for distributing the resources are organized. The hierarchical ordering matrix 400 indicates which rail is the most desirable to use for a particular distribution. In one embodiment and as shown in FIG. 4, the hierarchical ordering matrix 400 is configured as a table and particularly a look-up table. In another embodiment, the hierarchical ordering matrix may be stored/configured in a different way. In some embodiments, the hierarchical ordering matrix 400 is stored in a provider institution accounts database 112. In other embodiments, the hierarchical ordering matrix 400 may be a part of the provider institution client application 146. In one example, provider institution accounts database 112 may store a source version of the hierarchical ordering matrix 400. The provider institution computing system 110 may periodically update the source version of the hierarchical ordering matrix 400 based on rail availability, rail parameters, etc. The provider institution computing system 110 may automatically push an updated version of the hierarchical ordering matrix 400 to the provider institution client application 146 such that the client application 146 may access the updated version even when in an off-line status (e.g., no access to an internet connection). The provider institution computing system 110 may push an updated hierarchical ordering matrix 400 to the provider institution client application 146 after every update, according to a predetermined update schedule (e.g., push an updated hierarchical ordering matrix to the provider institution client application 146 on the first of every month), or upon receiving a request for an updated hierarchical ordering matrix 400 from a user, for example.

The hierarchical ordering matrix 400 can include a plurality of rails that are available for distributing resources from an account. Each of the plurality of rails can be associated with at least one parameter. For example, each of the plurality of rails can be associated with at least one of a speed, a maximum transfer amount, a cost, and a routing method. The hierarchical ordering matrix 400 can be organized such that each of the plurality of rails has a relative position (e.g., ranking) within a hierarchy of the rails. For example, a first rail can be the most desirable rail to use for the distribution and a second rail can be the least desirable rail to use for the distribution. The remaining rails of the plurality of rails are ordered between the first rail and the second rail. The ranking of each of the plurality of rails may be dictated by a variety of factors (or any combination thereof) including but not limited to speed (e.g., how long it takes to complete the distribution), cost (e.g., how much it costs to use the rail), reliability (e.g., success rate of recipient receiving distribution), and security (e.g., likelihood of distribution being intercepted or received by someone other than the intended recipient), among others. The hierarchical ordering matrix 400 may be used to determine the preferred rail.

At step 508, the provider institution computing system 110 determines the preferred rail. The preferred rail is the network, system, or method used for the distribution of identified resources. In some embodiments, the distribution processing circuit 116 of the provider institution computing system 110 determines the preferred rail. In one embodiment, determining the preferred rail includes identifying a plurality of rails that are available to use for the distribution. The distribution processing circuit 116 may identify the available rails based on rails previously used by the provider institution computing system 110 to complete a distribution. For example, an available rail is any rail the provider institution computing system 110 is capable of utilizing to complete a distribution. In some embodiments, the distribution processing circuit 116 may apply the hierarchical ordering matrix 400 to the plurality of available rails to determine the preferred rail. Applying the hierarchical ordering matrix 400 to the plurality of available rails may include comparing the hierarchical ordering matrix 400 with account information associated with the account from which the resources are being distributed. The account information can include, for example, a customer preference, customer information, the type of distribution being performed, resource information, etc. The account information may be compared to the plurality of payment rails of the hierarchical ordering matrix 400 and their corresponding parameters. Comparing the hierarchical ordering matrix 400 with account information may cause the computing system to modify the hierarchical ordering matrix 400 such that the hierarchical ordering matrix 400 is customized for each distribution. For example, the hierarchical ordering matrix 400 may be modified based on the account information. For example, with reference to hierarchical ordering matrix 400, if a customer preference indicates the resources from the account are to be transferred to an account not associated with the provider institution and the value of the resources being distributed amounts to more than $50,000, the Transfer rail and the Zelle® rail may be removed from the hierarchical ordering matrix 400 or given a new (lower) ranking because the rail parameters do not match or satisfy the account information.

In some embodiments, each of the plurality of rails identified by the provider institution computing system 110 may have a rail parameter. The rail parameter refers to a characteristic of the rail, including but not limited to routing mechanism, speed, maximum distribution amount, and cost, etc. Determining the preferred rail by applying the hierarchical ordering matrix 400 may include comparing resource information with the parameter of the plurality of rails that are available to use for the distribution. For example, the provider institution computing system 110 may identify a plurality of rails that are available to use for a distribution of resources from an account associated with the provider institution. Each rail may have at least one parameter that the account, resources, and/or another facts must satisfy in order to use said rail. For example, a rail may have a maximum transfer amount. When an amount of the resources is over the maximum transfer amount of the rail, the provider institution computing system 110 may remove the rail from the plurality of available rails (e.g., remove from the hierarchical ordering matrix 400) or update the hierarchical ordering matrix 400 such that the rail is moved to a position within the hierarchical ordering matrix 400 indicating the rail as a less desirable option. The distribution processing circuit 116 may compare the resource information with the rail parameter of the plurality of rails, or a subset of the plurality of rails. The distribution processing circuit 116 may determine that the resource information satisfies the rail parameter of the plurality of rails or a subset of the plurality of rails. For example, the distribution processing circuit 116 may determine the resource information satisfies the rail parameter of a single rail. Based on the resource information satisfying the rail parameter of the single available rail, the distribution processing circuit 116 can select the single rail as the preferred rail.

In another embodiment, the distribution processing circuit 116 may determine the resource information satisfies the rail parameter for more than one of the plurality of rails. In such an embodiment, the distribution processing circuit 116 may modify the hierarchical ordering matrix 400 to only include the more than one of the plurality of rails for which the resource information satisfies the rail parameter. Alternatively, the hierarchical ordering matrix 400 may still include all of the plurality of rails, but the more than one of the plurality of rails for which the resource information satisfies the rail parameter may be assigned rankings above the rails for which the parameter was not satisfied. For example, distribution processing circuit 116 may determine that the resource information satisfies the rail parameter for a subset of the plurality of rails. Based on the hierarchical ordering matrix 400, the distribution processing circuit 116 may select one of the subset of the plurality of available rails to be the preferred rail. For example, the rail that is determined to be the preferred rail may be the top ranked rail (e.g., Rank 1) within the hierarchical ordering matrix 400 with respect to the subset of the plurality of available rails.

In another embodiment, instead of modifying the hierarchical ordering matrix 400, when determining the preferred rail, the rail selection circuit 122 compares the resource information with the parameter of the rail with the top ranking within the hierarchical ordering matrix 400. If the resource information satisfies the parameter associated with the rail with the top ranking within the hierarchical ordering matrix 400, the rail selection circuit 122 determines the rail with the top ranking within the hierarchical ordering matrix

400 is the preferred rail. Satisfying the parameter may include falling within a predefined range, being above or below a threshold, matching a value or not (e.g., binary, yes or no, etc.), etc. For example, the parameter may be a maximum transfer amount. The maximum transfer amount may define a threshold amount of resources that can be transferred using the rail. If the amount of resources being distributed falls below the threshold, the resource information satisfies the parameter. If the amount of resources falls above the threshold, the resource information may not satisfy the parameter. If the resource information does not satisfy a parameter of the rail with the top ranking within the hierarchical ordering matrix 400, the rail selection circuit 122 may determine the rail with the top ranking within the hierarchical ordering matrix 400 is not the preferred rail. The rail selection circuit 122 may then compare the resource information with a rail with a second position within the hierarchical ordering matrix 400. This process may continue until the rail selection circuit 122 finds a rail with parameters that are all met by the resource information.

Comparing resource information with parameters of a plurality of rails organized in a hierarchical ordering matrix 400 allows the provider institution computing system 110 to determine the preferred rail without requiring input from a customer. This enables the system to reduce the amount of energy required for the system to determine the preferred rail. Additionally, when comparing the resource information with the rail with the top ranking within the hierarchical ordering matrix 400, the provider institution computing system 110 can determine a preferred rail without having to analyze each of the plurality of rails. This also requires less storage because it can use the same default predetermined selection order for all customers. Further, when new rails become available, only the hierarchical ordering matrix 400 needs to be updated, then the updated hierarchical ordering matrix 400 can be applied to all the customer accounts, instead of having to update all accounts individually.

In another embodiment, determining the preferred rail by applying the hierarchical ordering matrix 400 may include comparing a customer preference with the parameters of the plurality of rails of hierarchical ordering matrix 400. The provider institution computing system 110 may receive a request from a customer indicating the customer wants to provide or update a customer preference. In another embodiment, the provider institution computing system 110 may automatically prompt the customer to provide a customer preference (e.g., when opening an account, when determining the preferred rail and determining there is no customer preference in the provider institution accounts database 112 associated with the account, etc.). A customer preference may include directions regarding a preferred distribution methodology (e.g., which rail to use, how to prioritize the available rails, who to send the resources to, how much to distribute, etc.). Comparing a customer preference with the plurality of rails of hierarchical ordering matrix 400 may include generating a user interface to display on a screen 142 of a user device 140 to prompt a user to provide a customer preference regarding a preferred rail. The provider institution computing system 110 may transmit the user interface to the user device 140. Alternatively or additionally, the provider institution computing system 110 may transmit a notification to the provider institution client application 146 to generate and provide a user interface on the user device 140. The provider institution computing system 110 may receive, via the user device, an input from the customer indicating the customer preference (e.g., based on a message sent wirelessly over the network to the provider institution computing system 110). In another embodiment, the input may indicate the customer does not want to provide a customer preference. For example, the provider institution computing system 110 may generate user interface 300 and display user interface 300 to the user via the user device 140 when the user device 140 is accessing a web interface. When the user device 140 is accessing the provider institution client application 146, the provider institution client application 146 may generate user interface 100 and display user interface 300 to the user via the device 140. Responsive to receiving the user interface 300, the provider institution computing system 110 may receive a customer preference via the user interface 300. In one embodiment, the customer preference indicates a specific rail to use when executing distributions. For example, the customer preference specifies using a third party computing system client application 147 (e.g. Zelle®) when making distributions from an account associated with the customer. The third party computing system client application 147 may be associated with a third party. If the customer has a plurality of accounts with the provider institution, the customer preference may be applied to all accounts or to a subset of the plurality of accounts. Similarly, resources may be distributed for various reasons (e.g., closing an account, paying out dividends, etc.). A customer preference may be applied to all distributions or a subset of distributions. For example, the customer preference may indicate that a first type of distribution can use a first rail and a second type of distribution can use a second rail. For example, only distributions associated with closing an account may use a third party application to execute the distribution. All other distributions may use an ACH transfer. The provider institution computing system 110 may receive the customer preference and store the customer preference in the provider institution accounts database 112. In addition to storing the customer preference, the provider institution computing system 110 may modify the hierarchical ordering matrix 400 to coincide with the customer preference. For example, when the customer preference indicates all distributions are to be performed via an ACH transfer, the provider institution computing system 110 may rearrange the hierarchical ordering matrix 400 such that the ACH transfer rail has the top ranking within the hierarchical ordering matrix 400. In some embodiments, the provider institution computing system 110 may remove all other rails from the hierarchical ordering matrix 400. In other embodiments, the provider institution computing system 110 rearranges the other rails accordingly. In some embodiments, the provider institution computing system 110 may rearrange the hierarchical ordering matrix 400 such that if for some reason the distribution cannot be executed via the specified rail based on the customer preference, the second best option is the rail that is most similar to the specified rail, and that also satisfies any other parameters or other customer preferences. Determining a similarity between rails can be based on any of the parameters provided in the hierarchical ordering matrix 400.

In some embodiments, responsive to receiving the input from the customer indicating the customer preference, wherein the customer preference specifies a third party computing system client application 147 as the preferred rail, the provider institution computing system 110 or the provider institution client application 146 may generate a second user interface. The second user interface may facilitate linking the third party application to the account if the third party application is not already linked. For example, the provider institution computing system 110 may determine that the specified third party computing system client application 147 is not linked to the account. Responsive to determining the third party application is not linked to the account, the provider institution computing system 110 may generate the second user interface to facilitate the linking of the third party computing system client application 147. For example, the provider institution computing system 110 may generate user interface 200. In some embodiments, when the customer preference indicates a specific third party computing system client application 147, user interface 200 may only display the third party computing system client application 147. Responsive to receiving input from the customer indicating selecting the third party computing system client application 147, the provider institution computing system 110 may generate a third user interface linked directly with the third party computing system client application 147. In other embodiments, the second user interface is the user interface linked directly to the third party computing system client application 147. The user interface linked directly with the third party computing system client application 147 may prompt the customer to input account credentials corresponding to an account associated with the third party application. The provider institution computing system 110 may receive the account credentials. Responsive to receiving the account credentials, the provider institution computing system 110 may transmit a verification request to a third party computing system 130 associated with the third party. The provider institution computing system 110 may receive a verification confirmation from the third party computing system 130. The verification confirmation may indicate that the customer is authorized to use the third party application for distribution purposes. Responsive to receiving the verification confirmation, the provider institution computing system 110 may store the account credentials in the provider institution accounts database 112. The provider institution computing system 110 may then link the third party computing system client application 147 to the account. While the third party computing system client application 147 is linked to the account, the provider institution computing system 110 may detect if the account credential becomes invalid (e.g., periodically sends verification requests, attempts to make a distribution, etc.). When the provider institution computing system 110 detects the account credential is invalid, the provider institution computing system 110 can alert the customer. The alert can be, for example, sending an email to the customer or providing a user interface prompting the customer to input a new account credential when the customer accesses the provider institution computing system 110. This ensures that credentials remain valid and updated such that when a distribution is activated, the necessary information to complete the distribution already stored in the provider institution computing system 110.

In other embodiments, the customer preference may indicate a specific parameter to prioritize when determining a preferred rail. For example, the provider institution computing system 110 may receive a customer preference indicating a specific rail parameter to prioritize when determining a preferred rail. For example, the customer preference may restrict the available payment parameters to only those that complete distributions in real time. Therefore, even if a wire transfer or an ACH money transfer may be more reliable than other rails, the customer preference may restrict the distribution processing circuit 116 from using said rails because they are not completed in real time. When applying the hierarchical ordering matrix 400 with a customer preference indicating a specific parameter to prioritize when determining the preferred payment rail, the hierarchical ordering matrix 400 may be reorganized such that the rail(s) satisfying the specific parameter are ranked appropriately within the hierarchical ordering matrix 400.

In some embodiments, an account associated with the provider institution may include a plurality of customer preferences. In one embodiment, a second customer preference builds on a first customer preference. For example, the computing system may receive the first customer preference indicating determining the preferred rail based on speed of completing the distribution. The provider institution computing system 110 may receive the second customer preference indicating determining the rail based on cost of using the rail. The first customer preference may have priority over the second customer preference. In such an embodiment, the combination of the first and second customer preferences effectively instructs the rail selection circuit 122 how to prioritize the rails within the hierarchical ordering matrix 400. For example, with the first customer preference indicating speed of the rail, the rail selection circuit 122 may first prioritize the plurality of rails by speed (e.g., fastest rails have best rankings within the hierarchical ordering matrix 400). Next, with the second customer preference indicating cost of the rail, rail selection circuit 122 ranks the fastest priority rail with the lowest cost higher than an equally fast priority rail with a higher cost. If there would be a tie between priority positions of the rails, the rail selection circuit 122 may use the default order of the hierarchical ordering matrix 400 to determine the preferred rail.

In other embodiments, a provider institution client application 146 may receive a plurality of alternative customer preferences. For example, a first customer preference may indicate a specific recipient for a distribution for a first set of circumstances and indicate a different recipient for a distribution for a second set of circumstances. For example, the first customer preference may indicate a charity as the recipient of a distribution when the circumstance includes a resource value equal to or less than $50. The second customer preference may indicate the owner of the account as the recipient of a distribution when the circumstance includes a resource value over $50. In such an embodiment, the provider institution computing system 110 may apply the same hierarchical ordering matrix 400 to both customer preferences. However, when the same hierarchical ordering matrix 400 cannot be applied to both customer preferences (e.g., electronic transfer of money is only available for the first recipient), the computing system may generate a custom hierarchical ordering matrix 400 based on each customer preference. For example, the provider institution computing system 110 may generate a first hierarchical ordering matrix 400 with a first arrangement for the first customer preference and a second hierarchical ordering matrix 400 with a second arrangement for the second customer preference.

If customer preferences contradict each other, the rail selection circuit 122 may detect the contradiction. For example, the rail selection circuit 122 may identify two different actions that it is supposed to perform for a single circumstance and determine that it cannot perform both successfully. For example, a first preference may indicate notifying the customer when any distribution initiating event is detected and a second preference may indicate notifying the customer only when a mortgage overage is detected. With these preferences, the rail selection circuit 122 may detect that it is supposed to send a notification when the provider institution computing system 110 detects an account closure request, but it is also not supposed to send a notification when the provider institution computing system 110 detects an account closure request. Detecting the contradiction may occur as the customer is providing the customer preferences. In other embodiments, detecting the contradiction may occur when the rail selection circuit 122 is attempting to determine a preferred rail after identifying the resources to be distributed.

In one embodiment, responsive to detecting the contradiction, the distribution processing circuit 116 may automatically remove the customer preference with the contradiction and apply the default hierarchical ordering matrix 400 when selecting a preferred rail. In another embodiment, the provider institution computing system 110 notifies the customer of the contradiction. For example, the provider institution computing system 110 may transmit a user interface to the user device 140 that prompts the user to change the customer preferences to correct the contradiction. The notification may provide instructions on how to change the preferences. The notification may provide a suggested correction. The notification may provide a default action the rail selection circuit 122 will take if the customer does not correct the contradiction. The notification may provide a deadline for correcting the contradiction before the rail selection circuit 122 makes the suggested correction or takes the default action. The provider institution computing system 110 may provide an additional notification if the customer does not make a correction within a predetermined amount of time (e.g., one month after the initial notification, prior to identifying resources to be distributed, etc.).

As an illustrative example, the customer may provide a first customer preference indicating the recipient of the distribution to be a charity if the value of the distribution is less than or equal to a predefined value (e.g., $50). The customer may provide a second customer preference indicating the recipient of the distribution to be the customer if the value of the distribution is over a second predefined less than the first predefined value (e.g., $40). These are contradicting preferences since a distribution value between the first and second predefined values is told to go to both a charity and to the customer. The rail selection circuit 122 may detect this contradiction either immediately (e.g., as the customer is inputting the customer preferences) or at a later time (e.g., when the rail selection circuit 122 is attempting to select a preferred rail based on these customer preferences). Responsive to detection of the contradiction, the rail selection circuit 122 may transmit a notification to the user device 140 indicating the contradiction and steps to take to correct the contradiction.

In another embodiment, the rail selection circuit 122 prevents the customer from providing contradicting customer preferences. For example, when the customer is inputting the customer preferences via a user device 140, the rail selection circuit 122 may remove or make certain options unable to be selected based on the first customer preference. In another example, prior to accepting the customer preferences, the rail selection circuit 122 may conduct a contradiction test to detect any contradictory customer preferences. If there are none, the rail selection circuit 122 will accept and save the customer preferences. If contradictions are detected, the rail selection circuit 122 may prompt the customer to correct the contradiction prior to the rail selection circuit 122 accepting and saving the customer preferences. In another example, based on a first customer preference, the rail selection circuit 122 may auto-populate a second customer preference based on the first customer preference. The customer may then have the option to accept the auto-populated customer preferences or override it with a different input.

As an illustrative example, the customer may provide a first customer preference indicating the recipient of the distribution to be a charity if the value of the distribution is less than or equal to $50. Based on the first customer preference, the distribution processing circuit 116 may prompt the user to input a second preference indicating selecting a recipient for an amount over $50. In another embodiment, if the customer inputs a second customer preference that contradicts the first customer preference, the distribution processing circuit 116 may highlight (e.g., highlight, bold, flash, used different color, etc.) the contradictory portion of the second customer preference to draw the customer's attention to the faulty input.

A customer preference may be added, removed, or changed at any time. For example, a user of a user device 140 that is opening an account may apply a customer preference to the account during the opening procedure. In another example, after the account is open, the customer may access the customer preferences portion of the account at any time to input a new customer preference, modify a pre-existing customer preference, and/or a remove pre-existing customer preference.

Once the customer preference is received, the rail selection circuit 122 may determine the preferred rail based on the customer preference. For example, determining the preferred rail based on the customer preference may include identifying a plurality of rails, applying the customer preference to the plurality of rails, and determining a subset of the plurality of rails that satisfy the customer preference. Applying the customer preference to the plurality of rails can include filtering the plurality of rails to create a subset of rails that satisfy the customer preference, reordering the hierarchical ordering matrix 400 based on a specified factor (e.g., the customer preference indicates wanting to use the fastest rails), etc. The subset can include at least one rail that coincides with the customer preference. If there is more than one rail in the subset, the preferred rail can be selected based on the hierarchical ordering matrix 400. For example, the preferred rail may be the best ranked rail in the hierarchical ordering matrix 400 with respect to the subset of the plurality of rails.

In some embodiments, when the rail selection circuit 122 considers a customer preference when selecting preferred rail, the rail selection circuit 122 can also consider the payment parameters associated with the rails. For example, even if the customer preference specifies a rail as the preferred rail, the resource information may have to satisfy the rail parameter as well. For example, if the customer preference indicates using a specific rail as the preferred rail, but the amount of the resources to be transferred is over the maximum amount allowed by the rail, the rail selection circuit 122 may override the customer preference and use the default hierarchical ordering matrix 400 to select the preferred rail. In other embodiments, the rail selection circuit 122 may determine which rail is most like the rail specified by the customer preference that is satisfied by the resource information and use that as the preferred rail instead of the rail specified by the customer preference. Incorporating customer preferences into the preferred rail selection process streamlines the process such that the computing system has explicit directions regarding what to analyze and in what order to analyze them such that decisions can be made quicker without overloading the computer system.

In another embodiment, determining the preferred rail includes comparing customer information with the plurality of rails. Each rail may require certain customer information in order to execute a distribution of resources. For example, in order to mail a check to a recipient, the provider institution computing system 110 may require an address to send the check to. In another example, in order to transfer resources from the account associated with the provider institution to a recipient account (either associated or not associated with the provider institution), the provider institution computing system 110 may require the recipient account information (e.g. account number, routing number, account owner credentials, etc.). In yet another example, in order to distribute resources via a third party application (e.g., Zelle®), the provider institution computing system 110 may require the third party application to be linked to the account associated with the provider institution. The distribution processing circuit 116 may compare the plurality of rails with the customer information stored in the provider institution accounts database 112. For example, if the distribution processing circuit 116 does not have a mailing address, the rail comprising mailing a check cannot be used. In another example, if the distribution processing circuit 116 does not have a third party application linked to the account associated with the provider institution, the option to distribute the resources via a third party application is not available. In one embodiment, this comparison can determine what preferences a customer can provide. For example, the distribution processing circuit 116 can prevent the customer from selecting a rail when inputting a customer preference if the distribution processing circuit 116 determines that certain customer information is missing. In another embodiment, if the customer inputs a preference indicating to use a rail and the provider institution computing system 110 does not have the necessary customer information to use that rail, the provider institution computing system 110 may prompt the customer to input the necessary information. In some embodiments, if customer does not provide the necessary information within a predetermined amount of time, the provider institution computing system 110 may select a different preferred rail to use to execute the distribution. The hierarchical ordering matrix 400 may be modified to accurately represent which rails are available based on the customer information available to the provider institution computing system 110. For example, when there is no third party application linked to the account, the third party application rail may be removed from the hierarchical ordering matrix 400 or given a low ranking.

In some embodiments, once the preferred rail is determined, initiating a distribution at step 510 includes generating and transmitting a notification to a user device 140 of the customer. The notification may include information regarding a preferred distribution methodology specified in a customer preference. To transmit the notification, the provider institution computing system 110 may retrieve electronic contact information for the customer. The provider institution computing system 110 may transmit the notification to a user device of the customer based on the contact information indicating the preferred distribution methodology for the resources of the account. This notification may be generated and transmitted at any time, including any time a customer preference is made, added, updated, or removed.

If this notification is transmitted prior to initiating the distribution, the provider institution computing system 110 may determine at least one of an expiration of a predefined amount of time subsequent to transmitting the notification or that a reply was received from the user device confirming the preferred distribution methodology, and determine the preferred rail based on the customer preference and at least one of the expiration of the predefined amount of time subsequent to transmitting the message or that a reply was received from the user device confirming the preferred distribution methodology.

In other embodiments, initiating a distribution at step 510 includes obtaining an acknowledgement from the owner of the account. In some embodiments, the customer preference may indicate an acknowledgement of the distribution by the account owner is required prior to initiating the distribution. Receiving an acknowledgement may include detecting the customer has received a notification, detecting the customer has interacted with the notification (e.g., dismissed the notification, opened the notification, etc.), or receiving an affirmation or approval of the distribution. For example, the provider institution computing system 110 may transmit a notification to the customer via the user device 140 indicating a pending distribution of resources. The notification may include details regarding the distribution (e.g., preferred rail, amount of resources being transferred, expected completion date, etc.). In other embodiments, the notification may include an option to accept or approve the distribution. The provider institution computing system 110 may then receive an indication from the user device 140. In some embodiments, the indication includes an affirmation that the notification was successfully delivered, and provide no indication of the customer's actions. In another embodiment, the indication includes a selection of the option to accept the preferred rail. In another embodiment, the indication includes an action taken by the customer such that the provider institution computing system can determine the customer has seen the notification. For example, the provider institution computing system 110 may generate a notification to be displayed on a screen 142 of a user device 140. The notification may be configured to be displayed on the screen 142 even when the user device 140 is in an inactive state (e.g., locked, sleep state, etc.). The customer may, without activating (e.g., waking up, unlocking, etc.) the user device 140, interact with the notification (e.g., dismiss the notification on the lock screen of a smart phone by swiping the notification off of the screen). Without the phone being activated, the provider institution computing system 110 may detect the interaction from the customer and consider the interaction as an acknowledgement of the notification. For example, responsive to the interaction from the customer, the user device 140 may transmit a signal (e.g., a message) to the provider institution computing system 110. The signal may indicate the interaction (e.g., the dismissal of the notification). The provider institution computing system 110 may interpret the signal indicating the interaction as an acknowledgement. This may be in contrast to a typical user device. For example, a dismissal of a notification of a typical user device (or of a typical application on a user device) generally indicates a lack of acknowledgement and indicates the user will look at the notification at a later time.

Responsive to receiving the acknowledgement, the provider institution computing system 110 may initiate the distribution of the resources via the preferred rail. In another embodiment, the distribution processing circuit 116 can receive a denial. The denial may indicate that the customer does not accept the preferred rail or does not want to proceed with the distribution. For example, if the preferred rail is to send the resources to another account associated with the provider institution, but the customer is planning on closing all accounts with the provider institution, the customer may prefer to get a check in the mail. The denial may also indicate the customer not accepting other aspects of the pending distribution. For example, the distribution may be scheduled to happen in a week. However, if the customer wants to delay the distribution, the customer may deny the distribution notification.

The provider institution computing system 110 may be configured to associate different interactions from the user with different responses. For example, provider institution computing system 110 may associate a direction of a swipe, a duration of an interaction (e.g., holds finger on notification for predetermined amount of time), a quantity of interactions (e.g., differentiate between a single tap and a double tap) with different responses. For example, detecting a swipe of the notification to the left may indicate an approval, while a swipe to the right may indicate a denial. Detecting a prolonged interaction with the notification for more than 2 second may indicate an approval, while a short interaction with the notification for less than 2 seconds may indicate a denial. Detecting a single tap on the notification may indicate an approval, while detecting a double tap may indicate a denial. In some embodiments, the provider institution computing system 110 may detect an interaction at any location on the screen 142 of the user device 140 (e.g., the user does not have to swipe the actual notification, but can swipe anywhere on the screen).

Receiving a denial of the distribution notification may cause the distribution processing circuit 116 to cancel the distribution. In other embodiments, receiving a denial of the distribution notification may cause the distribution processing circuit 116 to provide the user interface 300 to the customer to prompt the user to change the aspect of the distribution that the customer did not approve. In some embodiments, the customer may have the option to cancel the distribution.

In another embodiment, initiating a distribution may also include verifying authorization of a provider institution actor. For example, a distribution may require a person associated with the provider institution to approve and manage the distribution of resources from the account. Prior to distributing the resources, the distribution processing circuit 116 may require the provider institution actor to verify their authorization to manage the distribution. For example, the distribution processing circuit 116 may prompt the provider institution actor to input identification information. The distribution processing circuit 116 can compare the identification information with information stored in the provider institution accounts database 112 to determine whether the identification information corresponds to someone who is authorized to manage the distribution. In another example, the distribution processing circuit 116 may prompt the provider institution actor to input a credential, such as a password. The distribution processing circuit 116 can compare the credential with a credential stored in the provider institution accounts database 112 to determine whether the credential is correct or corresponds to someone who is authorized to manage the distribution.

In some embodiments, once the preferred rail is selected, the distribution processing circuit 116 automatically initiates a distribution using the preferred rail. Initiating the distribution may include transferring the resources to the recipient via the preferred rail. Transferring the resources may include electronically transferring resources from an account associated with the provider institution. In another embodiment, transferring resources may include generating a check to be mailed to the recipient. In other embodiments, transferring resources may include applying the resources to a prepaid card. In another embodiment, transferring resources may include dispensing cash to send to the recipient. Dispensing cash may include the provider institution computing system 110 activating a cash dispenser associated with the provider institution such that an amount of cash equivalent to the amount of the resources being distributed is ready to be delivered to the recipient. After initiating the distribution, the provider institution computing system 110 may receive an indication that the distribution of the resources is complete.

In some embodiments, initiating a distribution includes transmitting a notification. The notification can be sent to the owner of the account. In other embodiments, the notification can be sent to the recipient of the resources if someone other than the owner of the account is the recipient. The notification can include details regarding the distribution (e.g., preferred rail, resource amount, expected completion date, etc.). In some embodiments, the notification can include a request for the recipient (e.g., the owner or the recipient of the resources) to confirm receipt of the resources. The provider institution computing system 110 can send a plurality of notifications until the recipient confirms the success of the distribution or until a certain threshold is met (e.g., maximum number of notifications sent, time that has passed, etc.). In some embodiments, if the reason for the distribution was due to receipt of a request to close an account, upon receipt of a confirmation from the recipient of the notification, the provider institution computing system 110 can automatically close the account. Upon closing of the account, the provider institution computing system 110 may automatically remove at least a portion of the information associated with the account from the provider institution accounts database 112. This reduces the overall storage capacity required for the system by minimizing the amount of stored data that is no longer associated with an active account.

Referring now to FIG. 6, a flow diagram of a distribution method 600 for distributing resources from an account is shown, according to an exemplary embodiment. The method 500 may be implemented or performed by one or more of the components described above. As a brief overview, at step 602, a computing system receives an indication of a distribution initiating event. At step 604, the computing system identifies resources based on the distribution initiating event. At step 606, the computing system retrieves a hierarchical ordering matrix. At step 608, the computing system identifies whether there are customer preferences associated with the resources. At step 610, the computing system applies customer preferences to the hierarchical ordering matrix. At step 612, the computing system updated the hierarchical ordering matrix based on the customer preferences. At step 614, the computing system compares resource information with rail parameters. At step 616, the computing system updates the hierarchical ordering matrix based on the comparison of the resource information and the rail parameters. At step 618, the computing system determines a preferred rail based on the hierarchical ordering matrix. At step 620, the computing system determines whether it must notify a customer associated with the resources about the preferred rail. At step 622, the computing system generates a notification of the preferred rail. At step 624, the computing system receives a customer acknowledgement. At step 626, the computing system initiates a distribution of the resources. While FIG. 6 shows method 600 with steps in a particular order, it should be understood that the steps may be performed in any order and method 600 may include fewer or additional steps than shown.

At step 602, the provider institution computing system 110 may receive an indication of a distribution initiating event (e.g., mortgage overage, account closure request, etc.). Based on receipt of the indication, the provider institution computing system 110 may identify resources associated with the distribution initiating event. For example, the resources may be all resources associated with an account of a customer, some resources associated with the account, resources associated with a plurality of accounts, etc. At step 606, the provider institution computing system 110 may retrieve a hierarchical ordering matrix. The hierarchical ordering matrix may be configured to aid the computing system in determining how best to distribute the identified resources. The hierarchical ordering matrix may comprise the qualities as described earlier.

At step 608, the provider institution computing system 110 may identify any customer preferences associated with the identified resources. For example, the provider institution computing system 110 may have received input from a customer associated with the resources that indicate a specific rail is to be used for distributions or that a rail parameter is most important to the customer, among others. Upon identification of at least one customer preference, at step 610, the provider institution computing system 110 may apply the customer preference to the hierarchical ordering matrix. For example, if the customer preference indicates the customer prioritizes speed of a rail, the rails within the hierarchical ordering matrix may be reorganized such that the rails with the fastest speed have the top rankings.

At step 612, the provider institution computing system 110 may update the hierarchical ordering matrix based on the at least one identified customer preference. In other embodiments, the provider institution computing system 110 may determine that there are not customer preferences associated with the identified resources. In such an embodiment, the method 600 may jump from step 608 to step 614.

At step 614, the provider institution computing system 110 may compare resource information with rail parameters. For example, a rail parameter may include a maximum transfer amount. The computing system may compare the value of the identified resources with the maximum transfer amount. If the value of the identified resources is below or equal to the maximum transfer amount, the rail may be used for the distribution. If the value is above the maximum transfer amount, the rail may not be used for the distribution or it may be moved to a lower ranking in the hierarchical ordering matrix (e.g., could be used if resources were split up, but not the ideal rail to use).

At step 616, the provider institution computing system 110 may update the hierarchical ordering matrix based on the comparison of the resource information with the rail parameters. At step 618, the provider institution computing system 110 may determine the preferred rail based on the hierarchical ordering matrix.

At step 620, the provider institution computing system 110 may determine if the computing system must notify the customer associated with the resources about the preferred rail. For example, a customer preference may indicate that the provider institution computing system 110 is to provide a notification to the customer whenever a preferred rail is determined. Upon determining a notification is required, at step 622, the provider institution computing system 110 may generate a notification indicating the preferred rail. The notification may comprise additional about the distribution (e.g., resource amount, estimated completion date, recipient, etc.). In some embodiments, the notification may include a request for the customer to provide an acknowledgement of the preferred rail. In such an embodiment, at step 624, the provider institution computing system 110 may receive a customer acknowledgement from a user device associated with the customer. For example, the computing system may generate a notification to be displayed on a screen of the user device when the user device in in an inactive state (e.g., the notification is displayed on a locked screen). The provider institution computing system 110 may configure the notification such that a dismissal or action from the customer from the user device in the inactive state is detected as an acknowledgement of the preferred rail. As described in more detail above, the provider institution computing system 110 may associate different interactions with the user device with different responses (e.g., a single tap indicates an acceptance or acknowledgement and a double tap may indicate a denial). In another embodiments, the provider institution computing system 110 may configure the notification to include specific interaction points, wherein interaction with a specific interaction points indicates an acceptance or a denial (e.g., separate buttons to accept or deny that can be activated while the user device is in a locked state). In some embodiments, the computing system may receive a signal from the user device indicating the user device switched from inactive (e.g., locked) to active (e.g., unlocked). That indication may be considered an acknowledgement such that the customer does not have to provide any affirmative action with respect to the notification in order for the computing system to determine the preferred rail has been acknowledged. Upon receipt of the acknowledgment, at step 626, the computing system may initiate the distribution of the resources. In some embodiments, there is no requirement to receive an acknowledgement of the preferred rail. In such an embodiment, method 600 may jump from step 620 to step 626.

In some embodiments, the computing system may monitor the distribution process after initiating the distribution of the resources. The computing system may obtain data points from monitoring the distribution. For example, the computing system may obtain a starting point regarding rails and the rail parameters (e.g., speed of a rail). Upon initiation of a distribution, the computing system may monitor the progress of the distribution and obtain data points associated with the distribution. For example, the computing system may identify a specific amount of time the distribution takes to move from a customer account to a recipient. The computing system may associated that amount of time with a location of the recipient, a location of the customer, a rail used for that distribution, and any other information associated with that distribution. The computing system may continuously obtain such data points associated with various distributions and automatically update the hierarchical ordering matrix based on the data points. The computing system may implement artificial intelligence to predict a speed of a second distribution based on the data points from a previous first distribution. For example, the computing system may determine that Rail 1 completes a distribution faster than Rail 2 in Situation A, but Rail 2 is faster in Situation B. A situation may be defined by the characteristics of the distribution and the funds (e.g., amount of the funds, customer parameters, etc.). When the computing system determines a customer is in Situation B, the computing system can select Rail 2 as the preferred rail. The computing system may apply these data points to update the hierarchical ordering matrix. The artificial intelligence of the computing system may also generate a model to predict the speed of a distribution based on the data points. Therefore, computing system may update the hierarchical ordering matrix with predictive values for each individual scenario.

The embodiments described herein have been described with reference to drawings. The drawings illustrate certain details of specific embodiments that provide the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to resources, currency, or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims

What is claimed is:

1. A computer-implemented method of distributing resources, the method comprising:

receiving, by a computing system associated with a provider institution, an indication of a distribution initiating event;

retrieving, by the computing system, a hierarchical ordering matrix that utilizes at least one parameter to control a distribution of resources associated with the distribution initiating event, the hierarchical ordering matrix defining an application of a rail from a plurality of rails based on the at least one parameter;

determining, by the computing system, a preferred rail for distributing the resources based on the at least one parameter associated with at least one of the resources or a customer relative to the hierarchical ordering matrix, wherein determining the preferred rail comprises:

receiving, by the computing system, a customer preference regarding a preferred distribution methodology for the resources associated with the distribution initiating event, wherein the customer preference indicates a recipient of the resources as a third party when the resources have a value less than a predetermined value;

identifying, by the computing system, the resources associated with the distribution initiating event to be less than the predetermined value; and selecting, by the computing system, one of the plurality of rails to be the preferred rail based on the received customer preference and an amount of the resources to be distributed being less than a max transfer amount of the one of the plurality of rails that is selected to be the preferred rail;

receiving, by the computing system and from a customer device, an acknowledgement of the preferred rail, the acknowledgment received when the customer device is in a state that provides the customer with limited application functionalities; and initiating, by the computing system and in response to the acknowledgment, the distribution of the resources to the third party via the preferred rail.

2. The computer-implemented method of claim 1, further comprising:

receiving, by the computing system, an indication of the distribution of the resources; and removing, by the computing system, at least some information from the computing system, the at least some information associated with the customer of the provider institution associated with the resources.

3. The computer-implemented method of claim 1, further comprising:

modifying, by the computing system, the hierarchical ordering matrix based on account information regarding an account associated with the customer, wherein the account information comprises at least one of the customer preference, customer information, or information associated with the resources;

wherein determining the preferred rail for distributing the resources further comprises:

accessing, by the computing system, the modified hierarchical ordering matrix;

identifying, by the computing system, the rail from the modified hierarchical ordering matrix with a top ranking; and selecting, by the computing system, the rail from the modified hierarchical ordering matrix with the top ranking as the preferred rail.

4. The computer-implemented method of claim 3, wherein modifying the hierarchical ordering matrix comprises:

comparing, by the computing system, the information associated with the resources with a rail parameter of each of the plurality of rails of the hierarchical ordering matrix;

determining, by the computing system, the information associated with the resources satisfies the rail parameter of a hierarchical subset of the plurality of rails; and rearranging, by the computing system, the plurality of rails of the hierarchical ordering matrix, wherein rearranging the plurality of rails of the hierarchical ordering matrix comprises at least one of:

assigning, by the computing system, each rail of the hierarchical subset of the plurality of rails a ranking above remaining rails from the plurality of rails; or removing, by the computing system, the remaining rails from the hierarchical ordering matrix.

5. The computer-implemented method of claim 1, further comprising:

retrieving, by the computing system, electronic contact information for the customer; and generating and transmitting, by the computing system, a message to the customer device associated with the customer based on the electronic contact information indicating the preferred distribution methodology for the resources associated with the distribution initiating event.

6. The computer-implemented method of claim 5, wherein the customer preference indicates at least one of the preferred rail, a rail that is not the preferred rail, a factor to use when selecting the preferred rail, or the recipient for the distribution of the resources.

7. The computer-implemented method of claim 1, wherein determining the preferred rail comprises:

identifying, by the computing system, the plurality of rails;

applying, by the computing system, the customer preference to the plurality of rails;

determining, by the computing system, a subset of the plurality of rails that satisfy the customer preference and that has a max transfer amount that is greater than the amount of the resources; and selecting, by the computing system, one of the subset of the plurality of rails to be the preferred rail.

8. The computer-implemented method of claim 1, further comprising:

generating, by the computing system, a user interface to prompt the customer to provide the customer preference regarding the preferred rail;

transmitting, by the computing system, the user interface to the customer device associated with the customer; and receiving, by the computing system via the customer device, the customer preference.

9. The computer-implemented method of claim 8, wherein the customer preference specifies a third party application as the preferred rail, the method further comprising:

responsive to receiving the customer preference that specifies the third party application as the preferred rail, linking, by the computing system, the third party application to an account associated with the customer, wherein the linking of the third party application to the account comprises:

generating, by the computing system, a second user interface to facilitate linking the third party application to the account, wherein the second user interface provides a field for the customer to input an account credential corresponding to an account associated with the third party application;

receiving, by the computing system via the customer device, the account credential;

responsive to receiving the account credential, transmitting, by the computing system, a verification request to a third party computing system associated with the third party;

receiving, by the computing system, a verification confirmation; and storing, by the computing system, the account credential in an accounts database of the computing system.

10. The computer-implemented method of claim 8, wherein the customer preference defines that an approval of the preferred rail is required prior to initiating the distribution of the resources, the method further comprising:

transmitting, by the computing system, a notification to the customer device indicating a pending distribution of the resources, wherein the notification is displayed on the customer device when the customer device is in a locked state;

receiving, by the computing system, an input from the customer device without the customer unlocking the customer device or opening an application, the input indicating an acceptance of the preferred rail; and responsive to receiving the input indicating the acceptance of the preferred rail from the locked screen of the customer device, initiating, by the computing system, the distribution of the resources via the preferred rail.

11. A computing system, the computing system comprising:

a database configured to retrievably store data corresponding to a plurality of customers; and at least one processing circuit coupled to the database, the at least one processing circuit configured to:

receive an indication of a distribution initiating event;

retrieve a hierarchical ordering matrix that utilizes at least one parameter to control a distribution of resources associated with the distribution initiating event, the hierarchical ordering matrix defining an application of a rail of a plurality of rails based on the at least one parameter;

determine a preferred rail for distributing the resources based on the at least one parameter associated with at least one of the resources or a customer relative to the hierarchical ordering matrix;

receive, from a customer device, a customer preference regarding a preferred distribution methodology for the resources associated with the distribution initiating event, wherein the customer preference indicates a recipient of the resources as a third party when the resources have a value less than a predetermined value;

identify the resources associated with the distribution initiating event to be less than the predetermined value;

select one of the plurality of rails to be the preferred rail based on the received customer preference and an amount of the resources to be distributed being less than a max transfer amount of the one of the plurality of rails that is selected to be the preferred rail;

receive, from the customer device, an acknowledgement of the preferred rail, the acknowledgment received when the customer device is in a state that provides the customer with limited application functionalities; and initiate, in response to the acknowledgment, the distribution of the resources to the third party via the preferred rail.

12. The computing system of claim 11, wherein the at least one processing circuit is further configured to:

remove at least some information from the computing system, the at least some information associated with the customer associated with the resources.

13. The computing system of claim 11, wherein the at least one processing circuit is further configured to:

modify the hierarchical ordering matrix based on account information regarding an account associated with the customer, wherein the account information comprises at least one of the customer preference, customer information, and information associated with the resources;

wherein determining the preferred rail for distributing the resources comprises:

accessing the modified hierarchical ordering matrix;

identifying the rail from the modified hierarchical ordering matrix with a top ranking; and selecting the rail from the modified hierarchical ordering matrix with the top ranking as the preferred rail.

14. The computing system of claim 13, wherein modifying the hierarchical ordering matrix comprises:

comparing the information associated with the resources with a rail parameter of each of the plurality of rails of the hierarchical ordering matrix;

determining the information associated with the resources satisfies the rail parameter of a hierarchical subset of the plurality of rails; and rearranging the plurality of rails of the hierarchical ordering matrix, wherein rearranging the plurality of rails of the hierarchical ordering matrix comprises at least one of:

assigning each rail of the hierarchical subset of the plurality of rails a ranking above remaining rails from the plurality of rails; or removing the remaining rails from the hierarchical ordering matrix.

15. The computing system of claim 11, wherein the at least one processing circuit is further configured to:

retrieve electronic contact information for the customer; and generate and transmit a message to the customer device of the customer based on the electronic contact information indicating the preferred distribution methodology for the resources associated with the distribution initiating event.

\* \* \* \* \*